(12) United States Patent
Cheon

(10) Patent No.: US 8,582,901 B2
(45) Date of Patent: *Nov. 12, 2013

(54) METHOD AND APPARATUS FOR ENCODING AND DECODING CODING UNIT OF PICTURE BOUNDARY

(71) Applicant: Samsung Electronics Co., Ltd., Gyeonggi-do (KR)

(72) Inventor: Min-su Cheon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/685,297

(22) Filed: Nov. 26, 2012

(65) Prior Publication Data

US 2013/0083861 A1 Apr. 4, 2013

Related U.S. Application Data

(63) Continuation of application No. 13/485,175, filed on May 31, 2012, now Pat. No. 8,320,688, and a continuation of application No. 13/344,249, filed on Jan. 5, 2012, now Pat. No. 8,208,742, and a continuation of application No. 12/915,818, filed on Oct. 29, 2010.

(30) Foreign Application Priority Data

Oct. 30, 2009 (KR) .................. 10-2009-0104421

(51) Int. Cl.
 *G06K 9/36* (2006.01)
 *G06K 9/46* (2006.01)
 *G06K 9/48* (2006.01)
 *H04N 7/12* (2006.01)
 *H04N 11/02* (2006.01)
 *H04N 11/04* (2006.01)

(52) U.S. Cl.
 USPC ........... 382/232; 382/238; 382/240; 382/242; 375/240.01; 375/240.24

(58) Field of Classification Search
 USPC ............. 382/232, 238, 240, 242; 375/240.01, 375/240.24
 See application file for complete search history.

(56) References Cited

U.S. PATENT DOCUMENTS

| 6,539,119 | B1 | 3/2003 | Kondo et al. |
| 6,798,977 | B2 | 9/2004 | Maeda |

(Continued)

FOREIGN PATENT DOCUMENTS

| JP | 10178639 A | 6/1998 |
| JP | 11146367 A | 5/1999 |

(Continued)

OTHER PUBLICATIONS

International Search Report dated Jun. 17, 2011 in corresponding Korean application No. 2010007537.

(Continued)

*Primary Examiner* — John Strege
(74) *Attorney, Agent, or Firm* — Sughrue Mion, PLLC

(57) ABSTRACT

A method and apparatus for encoding an image is provided. An image coding unit, including a region that deviates from a boundary of a current picture, is divided to obtain a coding unit having a smaller size than the size of the image coding unit, and encoding is performed only in a region that does not deviate from the boundary of the current picture. A method and apparatus for decoding an image encoded by the method and apparatus for encoding an image is also provided.

6 Claims, 22 Drawing Sheets

(56) References Cited

U.S. PATENT DOCUMENTS

| 7,194,134 | B2 | 3/2007 | Bradshaw |
| 8,467,450 | B2 | 6/2013 | Moriya et al. |
| 2005/0114093 | A1 | 5/2005 | Cha et al. |
| 2006/0251330 | A1 | 11/2006 | Toth et al. |
| 2007/0098071 | A1 | 5/2007 | Ohgose |
| 2008/0181300 | A1 | 7/2008 | Hosaka et al. |
| 2008/0181522 | A1 | 7/2008 | Hosaka et al. |
| 2009/0271420 | A1 | 10/2009 | Kusui et al. |

FOREIGN PATENT DOCUMENTS

| JP | 2003125417 A | 4/2003 |
| JP | 2007124564 A | 5/2007 |
| JP | 2010193401 A | 9/2010 |
| KR | 1020050045746 A | 5/2005 |
| KR | 1020060027795 A | 3/2006 |
| KR | 100842558 B1 | 7/2008 |
| RU | 2346340 C2 | 2/2009 |
| RU | 2368095 C1 | 9/2009 |
| WO | 2007034918 A1 | 3/2007 |

OTHER PUBLICATIONS

Communication dated Feb. 18, 2013 issued by the Russian Patent Office in counterpart Russian Application No. 2012117819/08.
Communication dated Aug. 13, 2013 issued by the Japanese Patent Office in counterpart Japanese Application No. 2013127566.
Communication dated Aug. 13, 2013 issued by the Japanese Patent Office in counterpart Japanese Application No. 2013127567.
Communication dated Jul. 10, 2013 issued by the European Patent Office in counterpart European Application No. 13167711.4.
Communication dated Jul. 4, 2013 issued by the European Patent Office in counterpart European Application No. 10827134.7.
Fuzheng Yang et al., "CTB splitting on frame boundary for arbitrary resolution video," 3, Xidian University; Joint Collaborative Team on Video Coding (JCT-JV) of ITU-T SG16 WP3 and ISO/IEC JTC1/SC29/WG11 3rd Meeting; Guangzhou, China; Oct. 7-15, 2010; XP030007732; pp. 1-4.
Jaeil Kim et al., "Enlarging MB size for high fidelity video coding beyond HD," 36,VCEG Meeting; ITU-Telecommunications Standardization Sector, Video Coding Experts 36th Meeting; San Diego, California; Oct. 8-10, 2008; EP03003643; pp. 1-6.
Jianle Chen et al., "Object Boundary Based Motion Partition for Video Coding," 26, Picture Coding Symposium; Digital Media R&D, Samsung Electronics Co., Ltd.; Lisbon, Nov. 7, 2007; XP030080454; pp. 1-4.
Jungwoo Lee et al., "Status of Core Experiment P5: Variable-Block Size MC Prediction," David Sarnoff Research Center; ISO/IEC JTC1/SC29/WG11; MPEG 96/M1111; Finland; Jul. 1996; XP030030505; pp. 1-2.
Communication dated Jul. 10, 2013 issued by the European Patent OFfice in counterpart European Application No. 13167729.6.
Krit Panusopone et al., "Flexible Picture Partitioning," 94, MPEG Meeting; Motorola Mobility; Joint Collaborative Team on Video Coding (JCT-VA) of ITU-T SG16 WP3 and ISO/IEC JTC1/SC29/WG11 3rd Meeting; Guangzhou, China; Oct. 7-15, 2010; XP030046891; pp. 1-13.
Oscar Divorra et al., "Geometry-adaptive Block Partioning," 32, VCEG Meeting; 80; MPEG Meeting; ITU-Telecommunications Standardization Sector, Video Coding Experts Group (VCEG), 32nd Meeting; San Jose, California; Apr. 20-21, 2007; XP030003531; pp. 1-8.

FIG. 8A
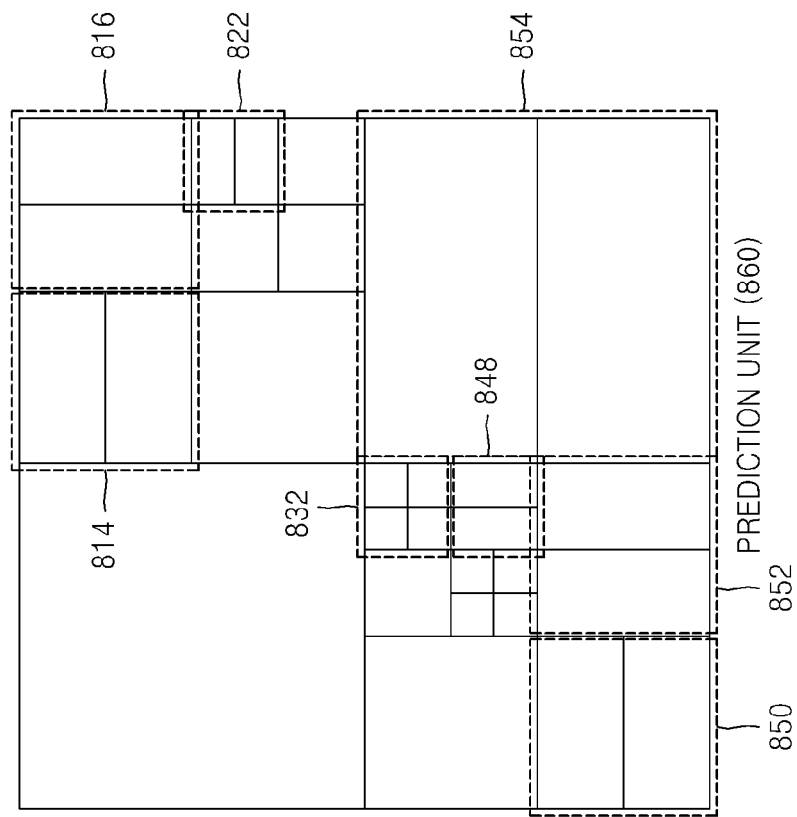
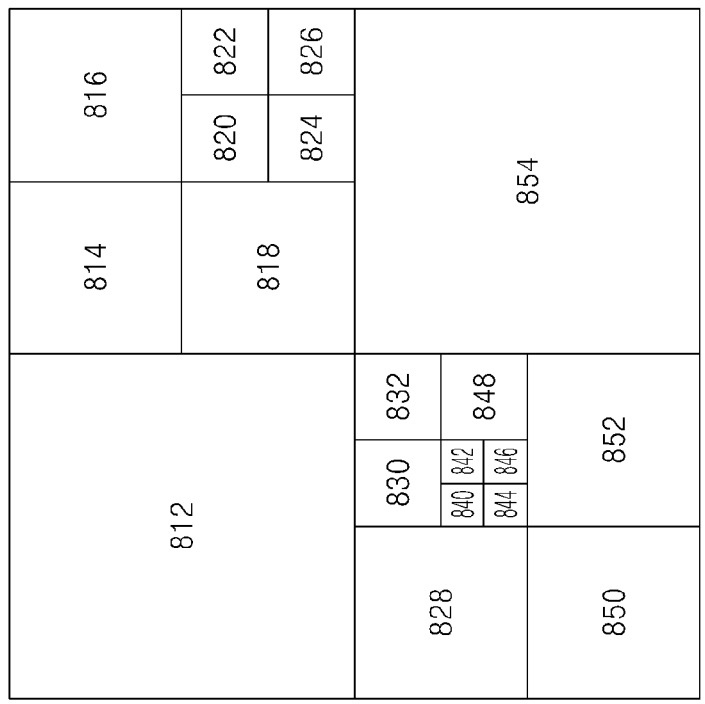

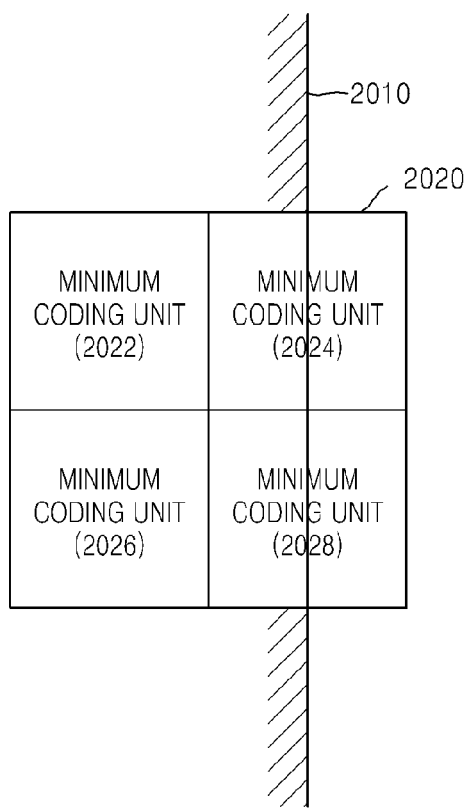 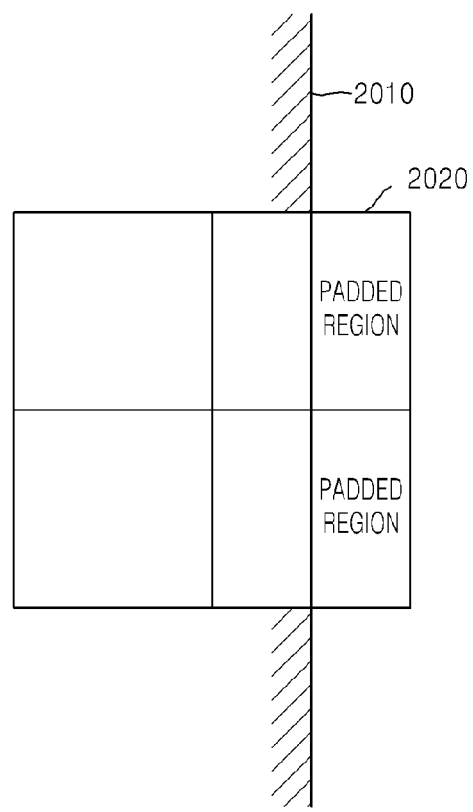

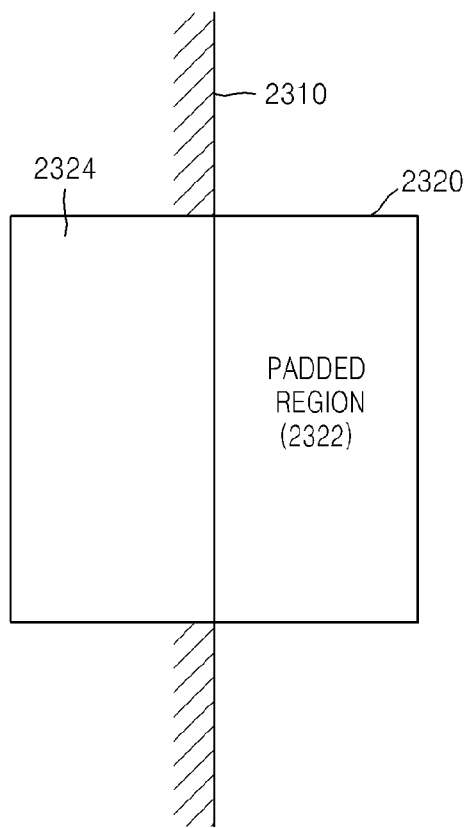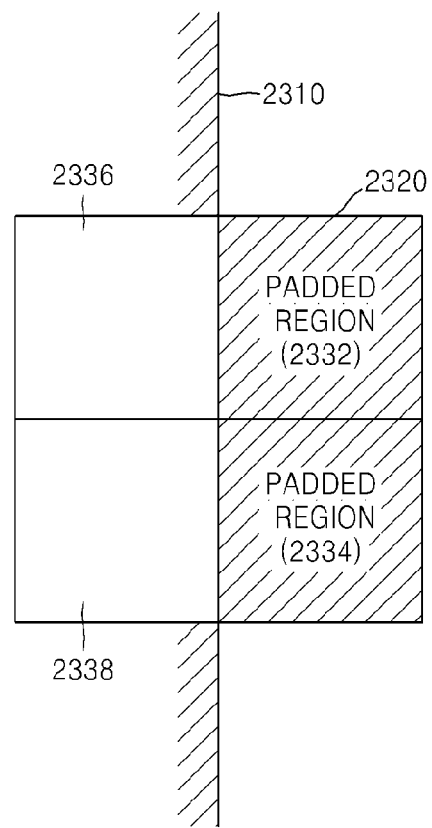

METHOD AND APPARATUS FOR ENCODING AND DECODING CODING UNIT OF PICTURE BOUNDARY

CROSS-REFERENCE TO RELATED PATENT APPLICATIONS

This is a Continuation Application of application Ser. No. 13/485,175 filed on May 31, 2012, which is Continuation of application Ser. No. 13/344,249 filed Jan. 5, 2012, which is a Continuation of application Ser. No. 12/915,818, filed Oct. 29, 2010, which claims the benefit of Korean Patent Application No. 10-2009-0104421, filed on Oct. 30, 2009, in the Korean Intellectual Property Office, the disclosures of which are incorporated herein in their entirety by reference.

BACKGROUND

1. Field

Apparatuses and methods consistent with the exemplary embodiments relate to encoding and decoding an image, and more particularly, to a method and apparatus for encoding and decoding an image coding unit of a picture boundary.

2. Description of the Related Art

In image compression methods, such as Moving Pictures Experts Group (MPEG)-1, MPEG-2, and MPEG-4 H.264/MPEG-4 Advanced Video Coding (AVC), an image is divided into blocks having a predetermined size so as to encode the image. Then, each of the blocks is prediction-encoded using inter prediction or intra prediction.

SUMMARY

The exemplary embodiments provide a method and apparatus for encoding and decoding a coding unit of a picture boundary.

The exemplary embodiments also provide a computer readable recording medium having recorded thereon a program for executing the method of encoding and decoding a coding unit of a picture boundary.

According to an aspect of the exemplary embodiments, there is provided a method of encoding an image, the method including: determining whether a first coding unit includes a region that deviates from a boundary of a current picture; dividing the first coding unit to obtain at least one second coding unit based on a result of the determining; and encoding only a second coding unit that does not deviate from the boundary of the current picture, from among the at least one second coding unit generated as a result of the dividing.

When the encoding of the second coding unit that does not deviate from the boundary of the current picture is performed, information about the dividing of the first coding unit is not encoded.

The determining of whether the first coding unit includes the region that deviates from the boundary of the current picture includes determining whether a left or right boundary of the first coding unit deviates from a left or right boundary of the current picture.

The determining of whether the first coding unit includes the region that deviates from the boundary of the current picture includes determining whether an upper or lower boundary of the first coding unit deviates from an upper or lower boundary of the current picture.

According to another aspect of the exemplary embodiments, there is provided a method of decoding an image, the method including: determining whether a first coding unit includes a region that deviates from a boundary of a current picture; parsing data regarding a second coding unit that does not deviate from the boundary of the current picture, from among at least one second coding unit generated by dividing the first coding unit based on a result of the determining; and decoding data regarding the second coding unit that does not deviate from the boundary of the current picture.

According to another aspect of the exemplary embodiments, there is provided an apparatus for encoding an image, the apparatus including: a determiner determining whether a first coding unit includes a region that deviates from a boundary of a current picture; a controller dividing the first coding unit to obtain at least one second coding unit based on a result of the determining; and an encoder encoding only a second coding unit that does not deviate from the boundary of the current picture, from among the at least one second coding unit generated as a result of the dividing.

According to another aspect of the exemplary embodiments, there is provided an apparatus for decoding an image, the apparatus including: a determiner determining whether a first coding unit includes a region that deviates from a boundary of a current picture; a parser parsing data regarding a second coding unit that does not deviate from the boundary of the current picture, from among at least one second coding unit generated by dividing the first coding unit based on a result of the determining; and a decoder decoding data regarding the second coding unit that does not deviate from the boundary of the current picture.

According to another aspect of the exemplary embodiments, there is provided a computer readable recording medium having embodied thereon a program for executing the method of encoding and decoding an image.

BRIEF DESCRIPTION OF THE DRAWINGS

The above and other aspects will become more apparent by describing in detail exemplary embodiments thereof with reference to the attached drawings in which:

FIGS. 8A and 8B illustrate division shapes of a coding unit, a prediction unit, and a frequency transformation unit, according to an exemplary embodiment;

FIGS. 20A and 20B illustrate a method of encoding a coding unit of a picture boundary, according to an exemplary embodiment;

FIGS. 23A and 23B illustrate a method of encoding a coding unit of a picture boundary, according to another exemplary embodiment.

DETAILED DESCRIPTION OF THE EXEMPLARY EMBODIMENTS

The exemplary embodiments will now be described more fully with reference to the accompanying drawings, in which exemplary embodiments are shown. Expressions such as "at least one of," when preceding a list of elements, modify the entire list of elements and do not modify the individual elements of the list. In the present specification, an "image" may denote a still image for a video or a moving image, that is, the video itself.

Figure 1:
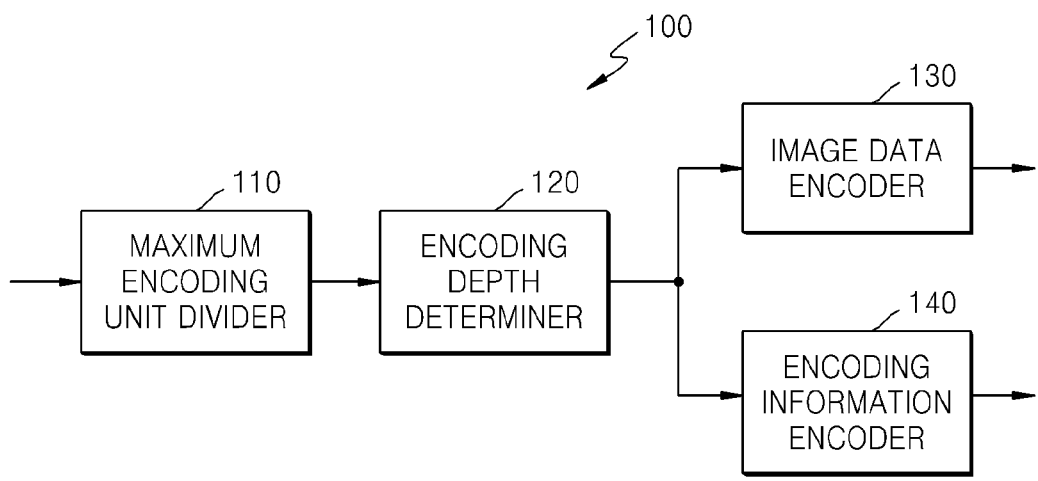
FIG. 1 is a block diagram of an apparatus for encoding an image, according to an exemplary embodiment.

FIG. 1 is a block diagram of an apparatus for encoding an image 100, according to an exemplary embodiment.

Referring to FIG. 1, the apparatus for encoding an image 100 includes a maximum coding unit divider 110, an encoding depth determiner 120, an image data encoder 130, and an encoding information encoder 140.

The maximum coding unit divider 110 can divide a current picture or slice based on a maximum coding unit that is a coding unit of the maximum size. That is, the maximum coding unit divider 110 can divide the current picture or slice to obtain at least one maximum coding unit.

According to an exemplary embodiment, a coding unit may be represented using a maximum coding unit and a depth. As described above, the maximum coding unit indicates a coding unit having the maximum size from among coding units of the current picture, and the depth indicates a degree obtained by hierarchically decreasing the coding unit. As a depth increases, a coding unit may decrease from a maximum coding unit to a minimum coding unit, wherein a depth of the maximum coding unit is defined as a minimum depth and a depth of the minimum coding unit is defined as a maximum depth. Since the size of a coding unit according to depths decreases from a maximum coding unit as a depth increases, a sub coding unit of a $k^{th}$ depth may include a plurality of sub coding units of a $(k+n)^{th}$ depth (k and n are integers equal to or greater than 1).

According to an increase of the size of a picture to be encoded, encoding an image in a greater coding unit may cause a higher image compression ratio. However, if a greater coding unit is fixed, an image may not be efficiently encoded by reflecting continuously changing image characteristics.

For example, when a smooth area such as the sea or sky is encoded, the greater a coding unit is, the more a compression ratio may increase. However, when a complex area such as people or buildings is encoded, the smaller a coding unit is, the more a compression ratio may increase.

Accordingly, according to an exemplary embodiment, a maximum image coding unit and a maximum depth having different sizes are set for each picture or slice. Since a maximum depth denotes the maximum number of times by which a coding unit may decrease, the size of each minimum coding unit included in a maximum image coding unit may be variably set according to a maximum depth.

The encoding depth determiner 120 determines a maximum depth. The maximum depth may be determined based on calculation of Rate-Distortion (R-D) cost. The maximum depth may be determined differently for each picture or slice or for each maximum coding unit. The determined maximum depth is provided to the encoding information encoder 140, and image data according to maximum coding units is provided to the image data encoder 130.

The maximum depth denotes a coding unit having the smallest size, which may be included in a maximum coding unit, i.e., a minimum coding unit. In other words, a maximum coding unit may be divided into sub coding units having different sizes according to different depths. This is described in detail later with reference to FIGS. 8A and 8B. In addition, the sub coding units having different sizes, which are included in the maximum coding unit, may be prediction- or frequency-transformed based on processing units having different sizes (values of pixel domains may be transformed into values of frequency domains, for example, by performing discrete cosine transformation (DCT)). In other words, the apparatus 100 for encoding an image may perform a plurality of processing operations for image encoding based on processing units having various sizes and various shapes. To encode image data, processing operations such as prediction, frequency transformation, and entropy encoding are performed, wherein processing units having the same size may be used for every operation or processing units having different sizes may be used for every operation.

For example, the apparatus for encoding an image 100 may select a processing unit that is different from a predetermined coding unit to predict the predetermined coding unit.

When the size of a coding unit is 2N×2N (where N is a positive integer), processing units for prediction may be 2N×2N, 2N×N, N×2N, and N×N. In other words, motion prediction may be performed based on a processing unit having a shape whereby at least one of height and width of a coding unit is equally divided by two. Hereinafter, a processing unit, which is the base of prediction, is defined as a 'prediction unit'.

A prediction mode may be at least one of an intra mode, an inter mode, and a skip mode, and a specific prediction mode may be performed for only a prediction unit having a specific size or shape. For example, the intra mode may be performed for only prediction units having the sizes of 2N×2N and N×N of which the shape is a square. Further, the skip mode may be performed for only a prediction unit having the size of 2N×2N. If a plurality of prediction units exist in a coding unit, the prediction mode with the least encoding errors may be selected after performing prediction for every prediction unit.

Alternatively, the apparatus 100 for encoding an image may perform frequency transformation on image data based on a processing unit having a different size from a coding unit. For the frequency transformation in the coding unit, the frequency transformation may be performed based on a data unit having a size equal to or smaller than that of the coding unit. Hereinafter, a processing unit, which is the base of frequency transformation, is defined as a 'transformation unit'.

The encoding depth determiner 120 may determine sub coding units included in a maximum coding unit using R-D optimization based on a Lagrangian multiplier. In other words, the encoding depth determiner 120 may determine which shape a plurality of sub coding units divided from the maximum coding unit have, wherein the plurality of sub coding units have different sizes according to their depths. The image data encoder 130 outputs a bitstream by encoding the maximum coding unit based on the division shapes determined by the encoding depth determiner 120.

The encoding information encoder 140 encodes information about an encoding mode of the maximum coding unit determined by the encoding depth determiner 120. In other words, the encoding information encoder 140 outputs a bitstream by encoding information about a division shape of the maximum coding unit, information about the maximum depth, and information about an encoding mode of a sub coding unit for each depth. The information about the encoding mode of the sub coding unit may include information about a prediction unit of the sub coding unit, information about a prediction mode for each prediction unit, and information about a transformation unit of the sub coding unit.

Information about division shapes of the maximum coding unit may be information that indicates whether each coding unit will be divided or not. For example, when the maximum coding unit is divided and encoded, information that indicates whether the maximum coding unit will be divided or not, is encoded, and even when a sub coding unit that is generated by dividing the maximum coding unit is sub-divided and encoded, information that indicates whether each sub coding unit will be divided or not, is encoded. Information that indicates division may be in the form of flag information that indicates division.

Since sub coding units having different sizes exist for each maximum coding unit and information about an encoding mode must be determined for each sub coding unit, information about at least one encoding mode may be determined for one maximum coding unit.

The apparatus 100 for encoding an image may generate sub coding units by equally dividing both height and width of a maximum coding unit by two according to an increase of depth. That is, when the size of a coding unit of a $k^{th}$ depth is 2N×2N, the size of a coding unit of a $(k+1)^{th}$ depth is N×N.

Accordingly, the apparatus 100 for encoding an image according to an exemplary embodiment may determine an optimal division shape for each maximum coding unit based on sizes of maximum coding units and a maximum depth in consideration of image characteristics. By variably controlling the size of a maximum coding unit in consideration of image characteristics and encoding an image through division of a maximum coding unit into sub coding units of different depths, images having various resolutions may be more efficiently encoded.

Figure 2:
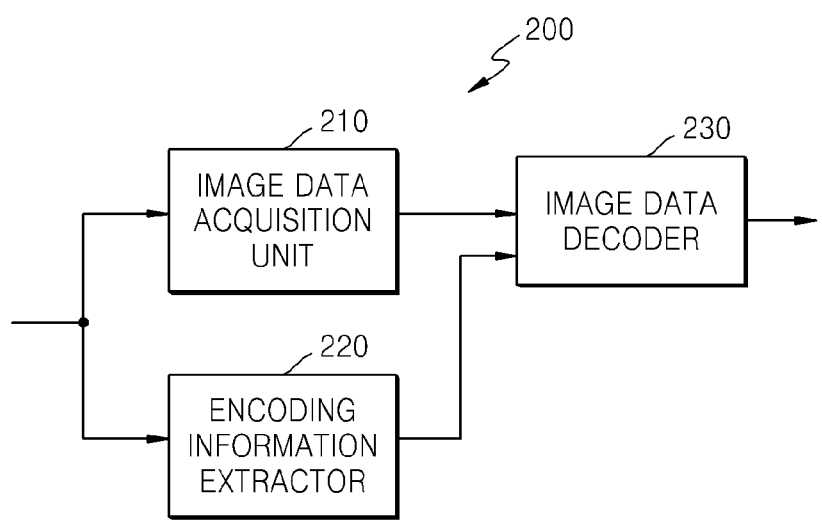
FIG. 2 is a block diagram of an apparatus for decoding an image, according to an exemplary embodiment.

FIG. 2 is a block diagram of an apparatus 200 for decoding an image, according to an exemplary embodiment.

Referring to FIG. 2, the apparatus 200 for decoding an image includes an image data acquisition unit 210, an encoding information extractor 220, and an image data decoder 230.

The image data acquisition unit 210 acquires image data according to maximum coding units by parsing a bitstream received by the apparatus 200 for decoding an image and outputs the image data to the image data decoder 230. The image data acquisition unit 210 may extract information about a maximum coding unit of a current picture or slice from a header of the current picture or slice. In other words, the image data acquisition unit 210 divides the bitstream in the maximum coding unit so that the image data decoder 230 may decode the image data according to maximum coding units.

The encoding information extractor 220 extracts information about a maximum coding unit, a maximum depth, a division shape of the maximum coding unit, an encoding mode of sub coding units from the header of the current picture by parsing the bitstream received by the apparatus 200 for decoding an image. The information about a division shape and the information about an encoding mode are provided to the image data decoder 230.

The information about a division shape of the maximum coding unit may include information about sub coding units having different sizes according to depths included in the maximum coding unit. As described above, the information about a division shape of the maximum coding unit may be information that indicates division encoded information for each coding unit, for example, flag information.

The information about an encoding mode may include information about a prediction unit according to a sub coding unit, information about a prediction mode, and information about a transformation unit.

The image data decoder 230 restores the current picture by decoding image data of every maximum coding unit based on the information extracted by the encoding information extractor 220.

The image data decoder 230 may decode sub coding units included in a maximum coding unit based on the information about a division shape of the maximum coding unit. A decoding process may include a motion prediction process including intra prediction and motion compensation and an inverse frequency transformation process.

The image data decoder 230 may perform intra prediction or inter prediction based on information about a prediction unit according to sub coding units and information about a prediction mode in order to predict a sub coding unit. The image data decoder 230 may also perform inverse frequency transformation for each sub coding unit based on information about a transformation unit of a sub coding unit.

Figure 3:
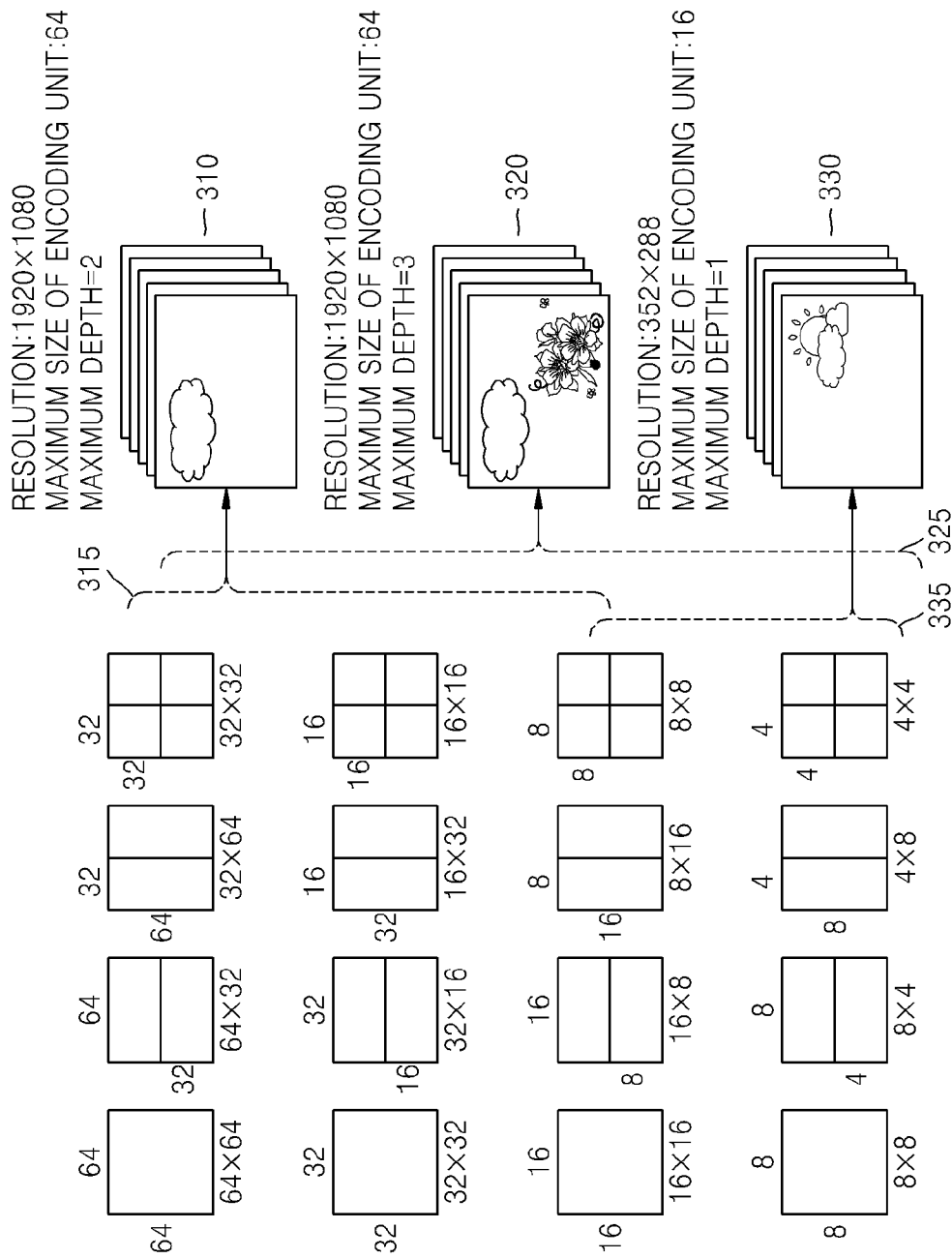
FIG. 3 illustrates hierarchical coding units according to an exemplary embodiment.

FIG. 3 illustrates hierarchical coding units according to an exemplary embodiment.

Referring to FIG. 3, the hierarchical coding units according to an exemplary embodiment may include coding units whose width×height dimensions are 64×64, 32×32, 16×16, 8×8, and 4×4. Besides these coding units having perfect square shapes, coding units whose width×height dimensions are 64×32, 32×64, 32×16, 16×32, 16×8, 8×16, 8×4, and 4×8 may also exist.

Referring to FIG. 3, for image data 310 whose resolution is 1920×1080, the size of a maximum coding unit is set to 64×64, and a maximum depth is set to 2.

For image data 320 whose resolution is 1920×1080, the size of a maximum coding unit is set to 64×64, and a maximum depth is set to 3. For image data 330 whose resolution is 352×288, the size of a maximum coding unit is set to 16×16, and a maximum depth is set to 1.

When the resolution is high or the amount of data is great, it is preferable that a maximum size of a coding unit is relatively great to increase a compression ratio and exactly reflect image characteristics. Accordingly, for the image data 310 and 320 having higher resolution than the image data 330, 64×64 may be selected as the size of a maximum coding unit.

A maximum depth indicates the total number of layers in the hierarchical coding units. Since the maximum depth of the image data 310 is 2, a coding unit 315 of the image data 310 may include a maximum coding unit whose longer axis size is 64 and sub coding units whose longer axis sizes are 32 and 16, according to an increase in depth.

On the other hand, since the maximum depth of the image data 330 is 1, a coding unit 335 of the image data 330 may include a maximum coding unit whose longer axis size is 16 and coding units whose longer axis sizes are 8 and 4, according to an increase in depth.

However, since the maximum depth of the image data 320 is 3, a coding unit 325 of the image data 320 may include a maximum coding unit whose longer axis size is 64 and sub coding units whose longer axis sizes are 32, 16, 8 and 4 according to an increase in depth. Since an image is encoded based on a smaller sub coding unit as the depth increases, the exemplary embodiment is suitable for encoding an image including more minute scenes.

Figure 4:
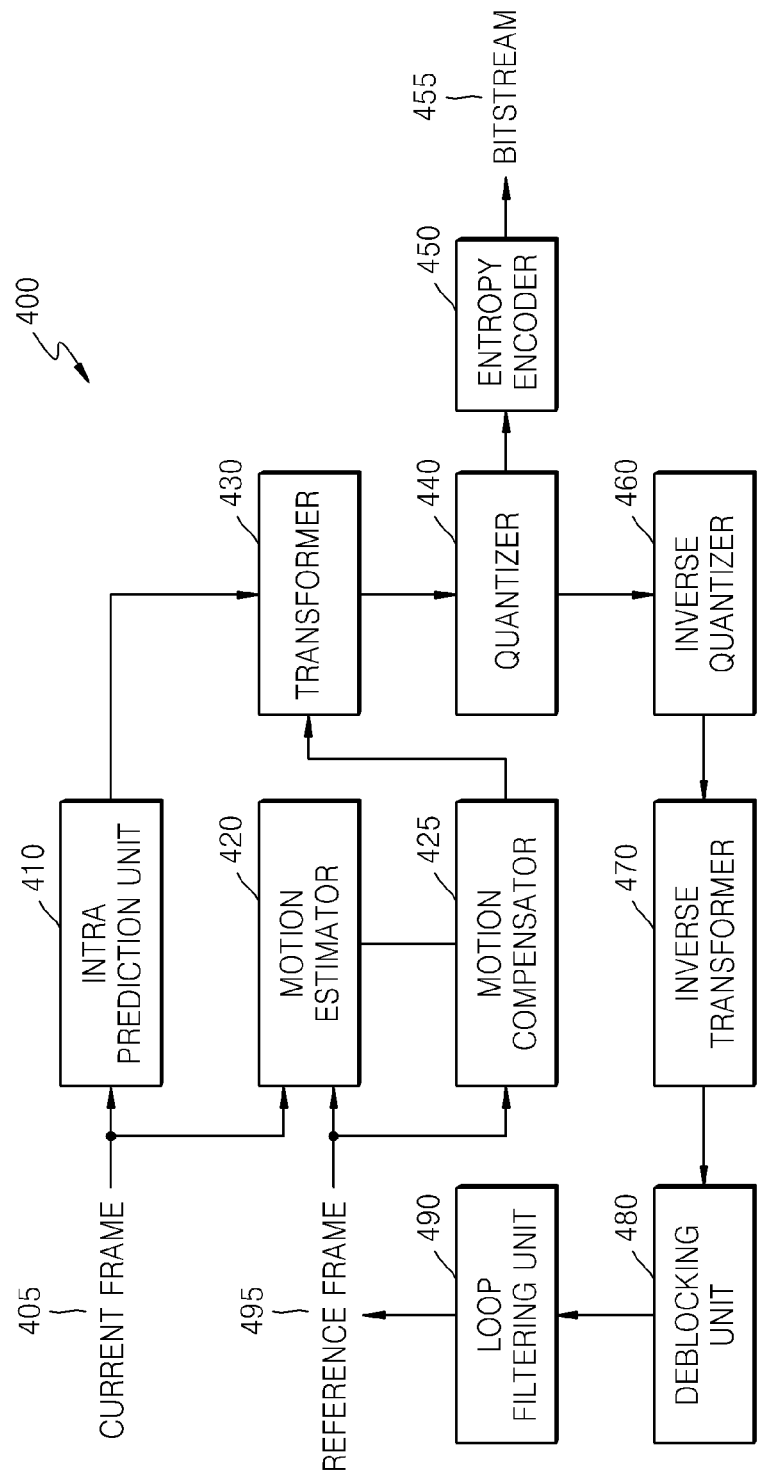
FIG. 4 is a block diagram of an image encoder based on a coding unit, according to an exemplary embodiment.

FIG. 4 is a block diagram of an image encoder 400 based on a coding unit, according to an exemplary embodiment.

An intra prediction unit 410 performs intra prediction on prediction units of the intra mode in a current frame 405, and a motion estimator 420 and a motion compensator 425 perform inter prediction and motion compensation on prediction units of the inter mode using the current frame 405 and a reference frame 495.

Residual values are generated based on the prediction units output from the intra prediction unit 410, the motion estimator 420, and the motion compensator 425, and the generated residual values are output as quantized transform coefficients by passing through a frequency transformation unit 430 and a quantizer 440.

The quantized transform coefficients are restored to residual values by passing through an inverse-quantizer 460 and an inverse frequency transformation unit 470, and the restored residual values are post-processed by passing through a deblocking unit 480 and a loop filtering unit 490 and output as the reference frame 495. The quantized transform coefficients may be output as a bitstream 455 by passing through an entropy encoder 450.

To perform encoding based on an encoding method according to an exemplary embodiment, components of the image encoder 400, i.e., the intra prediction unit 410, the motion estimator 420, the motion compensator 425, the frequency transformation unit 430, the quantizer 440, the entropy encoder 450, the inverse-quantizer 460, the inverse frequency transformation unit 470, the deblocking unit 480 and the loop filtering unit 490, perform image encoding processes based on a maximum coding unit, a sub coding unit according to depths, a prediction unit, and a transformation unit.

Figure 5:
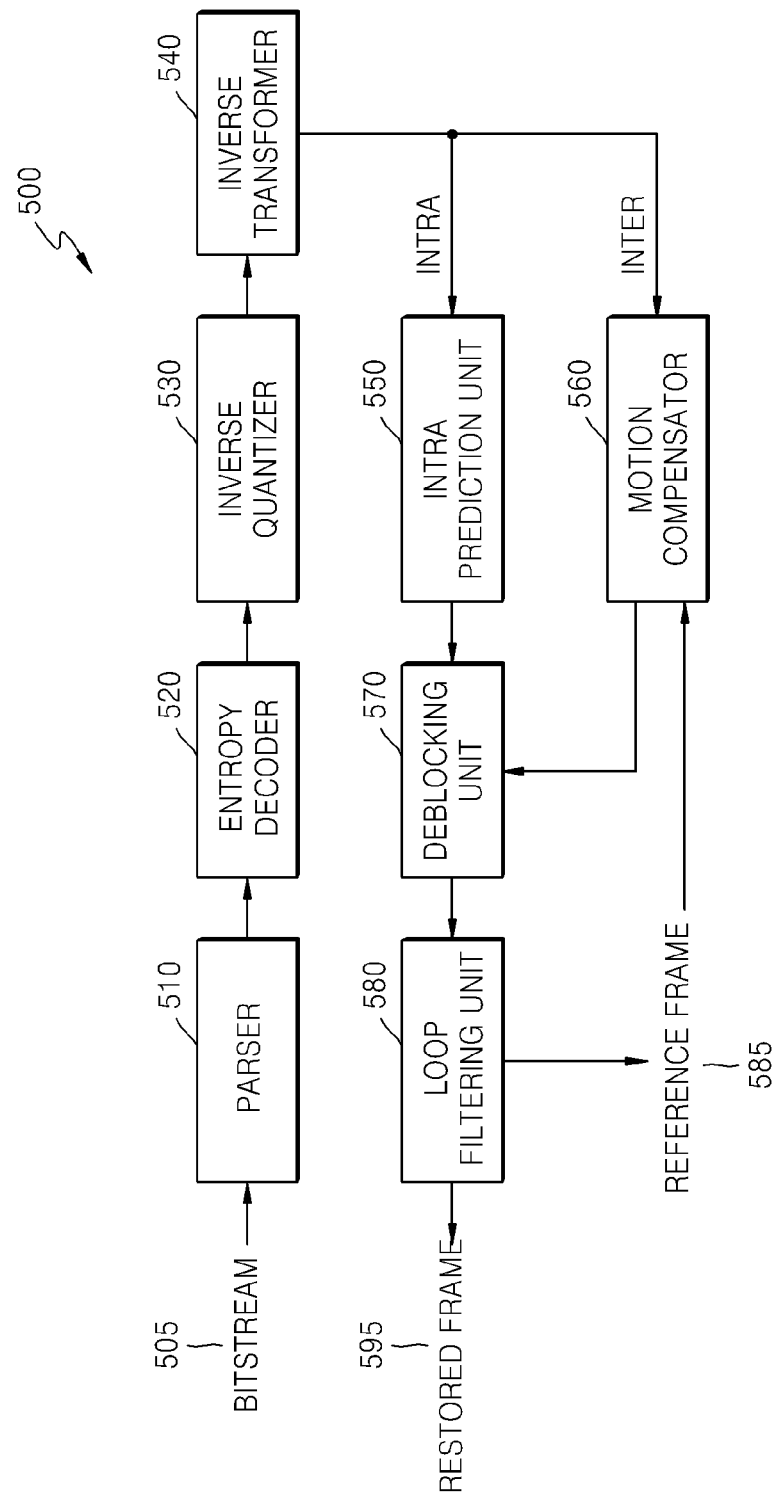
FIG. 5 is a block diagram of an image decoder based on a coding unit, according to an exemplary embodiment.

FIG. 5 is a block diagram of an image decoder 500 based on a coding unit, according to an exemplary embodiment.

A bitstream 505 passes through a parser 510 so that encoded image data to be decoded and encoding information necessary for decoding are parsed. The encoded image data is output as inverse-quantized data by passing through an entropy decoder 520 and an inverse-quantizer 530 and restored to residual values by passing through an inverse frequency transformation unit 540. The residual values are restored according to coding units by being added to an intra prediction result of an intra prediction unit 550 or a motion compensation result of a motion compensator 560. The restored coding units are used for prediction of next coding units or a next picture by passing through a deblocking unit 570 and a loop filtering unit 580.

To perform decoding based on a decoding method according to an exemplary embodiment, components of the image decoder 500, i.e., the parser 510, the entropy decoder 520, the inverse-quantizer 530, the inverse frequency transformation unit 540, the intra prediction unit 550, the motion compensator 560, the deblocking unit 570 and the loop filtering unit 580, perform image decoding processes based on a maximum coding unit, a sub coding unit according to depths, a prediction unit, and a transformation unit.

In particular, the intra prediction unit 550 and the motion compensator 560 determine a prediction unit and a prediction mode in a sub coding unit by considering a maximum coding unit and a depth, and the inverse frequency transformation unit 540 performs inverse frequency transformation by considering the size of a transformation unit.

Figure 6:
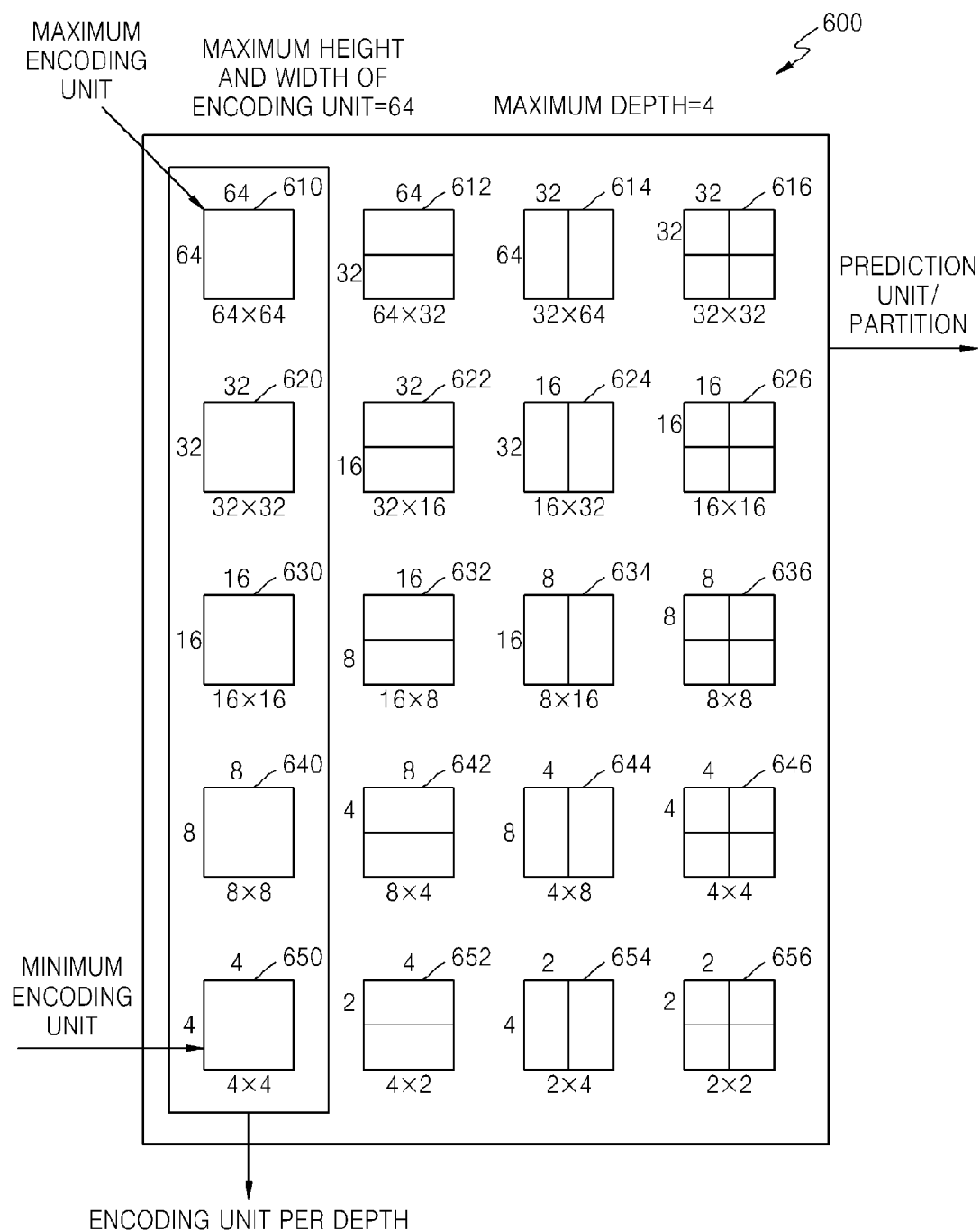
FIG. 6 illustrates a maximum coding unit, a sub coding unit, and a prediction unit, according to an exemplary embodiment.

FIG. 6 illustrates a maximum coding unit, a sub coding unit, and a prediction unit, according to an exemplary embodiment.

The apparatus 100 for encoding an image and the apparatus 200 for decoding an image according to an exemplary embodiment use hierarchical coding units to perform encoding and decoding in consideration of image characteristics. A maximum coding unit and a maximum depth may be adaptively set according to the image characteristics or variously set according to requirements of a user.

A hierarchical coding unit structure 600 according to an exemplary embodiment illustrates a maximum coding unit 610 whose height and width are 64×64 and maximum depth is 4. A depth increases along a vertical axis of the hierarchical coding unit structure 600, and as a depth increases, heights and widths of sub coding units 620 to 650 decrease. Prediction units of the maximum coding unit 610 and the sub coding units 620 to 650 are shown along a horizontal axis of the hierarchical coding unit structure 600.

The maximum coding unit 610 has a depth of 0 and the size of a coding unit, i.e., height and width, of 64×64. A depth increases along the vertical axis, and there exist a sub coding unit 620 whose size is 32×32 and depth is 1, a sub coding unit 630 whose size is 16×16 and depth is 2, a sub coding unit 640 whose size is 8×8 and depth is 3, and a sub coding unit 650 whose size is 4×4 and depth is 4. The sub coding unit 650 whose size is 4×4 and depth is 4 is a minimum coding unit.

Referring to FIG. 6, examples of a prediction unit are shown along the horizontal axis according to each depth. That is, a prediction unit of the maximum coding unit 610 whose depth is 0 may be a prediction unit whose size is equal to the coding unit 610, i.e., 64×64, or a prediction unit 612 whose size is 64×32, a prediction unit 614 whose size is 32×64, or a prediction unit 616 whose size is 32×32, which all have sizes smaller than the coding unit 610 whose size is 64×64.

A prediction unit of the coding unit 620 whose depth is 1 and size is 32×32 may be a prediction unit whose size is equal to the coding unit 620, i.e., 32×32, or a prediction unit 622 whose size is 32×16, a prediction unit 624 whose size is 16×32, or a prediction unit 626 whose size is 16×16, which all have sizes smaller than the coding unit 620 whose size is 32×32.

A prediction unit of the coding unit 630 whose depth is 2 and size is 16×16 may be a prediction unit whose size is equal to the coding unit 630, i.e., 16×16, or a prediction unit 632 whose size is 16×8, a prediction unit 634 whose size is 8×16, or a prediction unit 636 whose size is 8×8, which all have sizes smaller than the coding unit 630 whose size is 16×16.

A prediction unit of the coding unit 640 whose depth is 3 and size is 8×8 may be a prediction unit whose size is equal to the coding unit 640, i.e., 8×8, or a prediction unit 642 whose size is 8×4, a prediction unit 644 whose size is 4×8, or a prediction unit 646 whose size is 4×4, which all have sizes smaller than the coding unit 640 whose size is 8×8.

Finally, the coding unit 650 whose depth is 4 and size is 4×4 is a minimum coding unit and a coding unit of a maximum depth, and a prediction unit of the coding unit 650 is a prediction unit 650 whose size is 4×4.

Figure 7:
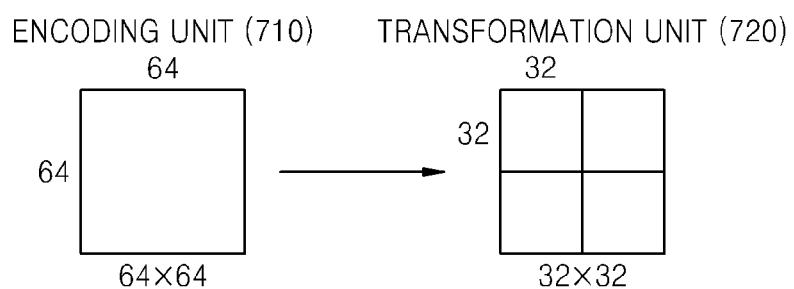
FIG. 7 illustrates a coding unit and a transformation unit, according to an exemplary embodiment.

FIG. 7 illustrates a coding unit and a transformation unit, according to an exemplary embodiment.

The apparatus for encoding an image 100 and the apparatus for decoding an image 200, according to an exemplary embodiment, perform encoding with a maximum coding unit itself or with sub coding units, which are equal to or smaller than the maximum coding unit, and are divided from the maximum coding unit.

In the encoding process, the size of a transformation unit for frequency transformation is selected to be no larger than that of a corresponding coding unit. For example, when a current coding unit 710 has the size of 64×64, frequency transformation may be performed using a transformation unit 720 having the size of 32×32.

Figure 8B:
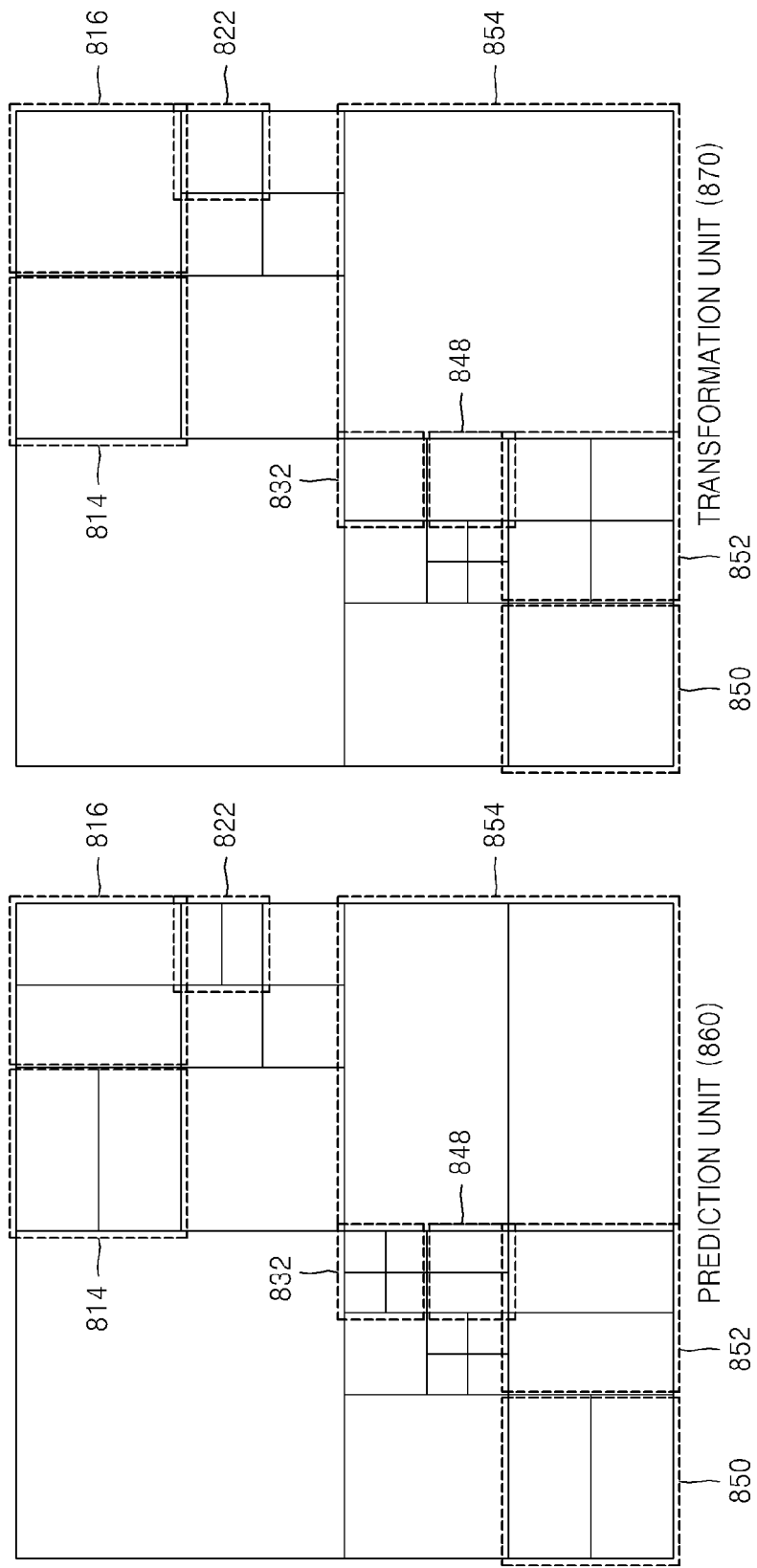

FIGS. 8A and 8B illustrate division shapes of a coding unit, a prediction unit, and a frequency transformation unit, according to an exemplary embodiment.

FIG. 8A illustrates a coding unit and a prediction unit, according to an exemplary embodiment.

A left side of FIG. 8A shows a division shape selected by the apparatus 100 for encoding an image, according to an exemplary embodiment, in order to encode a maximum coding unit 810. The apparatus 100 for encoding an image divides the maximum coding unit 810 into various shapes, performs encoding, and selects an optimal division shape by comparing encoding results of various division shapes with each other based on R-D cost. When it is optimal that the maximum coding unit 810 is encoded as it is, the maximum coding unit 810 may be encoded without dividing the maximum coding unit 810 as illustrated in FIGS. 8A and 8B.

Referring to the left side of FIG. 8A, the maximum coding unit 810 whose depth is 0 is encoded by dividing it into sub coding units whose depths are equal to or greater than 1. That is, the maximum coding unit 810 is divided into 4 sub coding units whose depths are 1, and all or some of the sub coding units whose depths are 1 are divided into sub coding units whose depths are 2.

A sub coding unit located in an upper-right side and a sub coding unit located in a lower-left side among the sub coding units whose depths are 1 are divided into sub coding units whose depths are equal to or greater than 2. Some of the sub coding units whose depths are equal to or greater than 2 may be divided into sub coding units whose depths are equal to or greater than 3.

The right side of FIG. 8A shows a division shape of a prediction unit 860 for the maximum coding unit 810.

Referring to the right side of FIG. 8A, a prediction unit 860 for the maximum coding unit 810 may be divided differently from the maximum coding unit 810. In other words, a prediction unit for each sub coding unit may be smaller than a corresponding sub coding unit.

For example, a prediction unit for a sub coding unit 854 located in a lower-right side among the sub coding units whose depths are 1 may be smaller than the sub coding unit 854 of the encoding unit 810. In addition, prediction units for some (814, 816, 850, and 852) of sub coding units 814, 816, 818, 828, 850, and 852 whose depths are 2 may be smaller than the sub coding units 814, 816, 850, and 852, respectively. In addition, prediction units for sub coding units 822, 832, and 848 whose depths are 3 may be smaller than the sub coding units 822, 832, and 848, respectively. The prediction units may have a shape whereby respective sub coding units are equally divided by two in a direction of height or width or have a shape whereby respective sub coding units are equally divided by four in directions of height and width.

FIG. 8B illustrates a prediction unit and a transformation unit, according to an exemplary embodiment.

A left side of FIG. 8B shows a division shape of a prediction unit for the maximum coding unit 810 shown in the right side of FIG. 8A, and a right side of FIG. 8B shows a division shape of a transformation unit of the maximum coding unit 810.

Referring to the right side of FIG. 8B, a division shape of a transformation unit 870 may be set differently from the prediction unit 860.

For example, even though a prediction unit for the coding unit 854 whose depth is 1 is selected with a shape whereby the height of the coding unit 854 is equally divided by two, a transformation unit may be selected with the same size as the coding unit 854. Likewise, even though prediction units for coding units 814 and 850 whose depths are 2 are selected with a shape whereby the height of each of the coding units 814 and 850 is equally divided by two, a transformation unit may be selected with the same size as the original size of each of the coding units 814 and 850.

A transformation unit may be selected with a smaller size than a prediction unit. For example, when a prediction unit for the coding unit 852 whose depth is 2 is selected with a shape whereby the width of the coding unit 852 is equally divided by two, a transformation unit may be selected with a shape whereby the coding unit 852 is equally divided by four in directions of height and width, and has a smaller size than the shape of the prediction unit.

Figure 9:
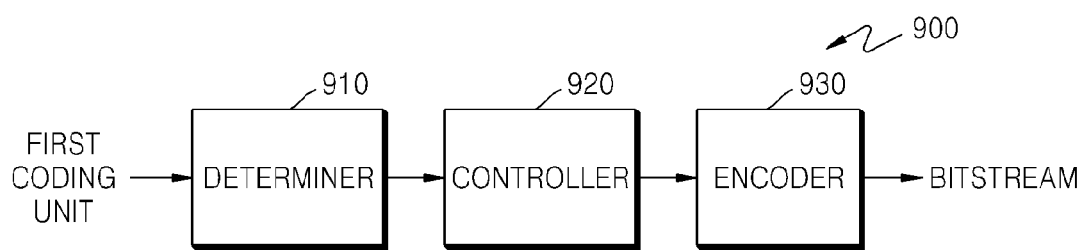
FIG. 9 is a block diagram of an apparatus for encoding an image, according to another exemplary embodiment.

FIG. 9 is a block diagram of an apparatus for encoding an image 900 according to another exemplary embodiment of.

Referring to FIG. 9, the apparatus 900 for encoding an image according to the current exemplary embodiment includes a determiner 910, a controller 920, and an encoder 930. The apparatus 900 for encoding an image may be an apparatus for encoding an image based on a coding unit, a prediction unit, and a transformation unit whose sizes are stepwise varied according to the depths described above.

The determiner 910 determines whether a first coding unit input to the apparatus 900 for encoding an image in order to perform encoding includes a region that deviates from a boundary of a current picture.

When the first coding unit does not include the region that deviates from the boundary of the current picture, the apparatus 900 for encoding an image encodes the first coding unit as it is. The apparatus 900 for encoding an image may also perform prediction and transformation, for example, DCT, without dividing the first coding unit or may also divide the first coding unit into a plurality of coding units according to a predetermined depth, as described above with reference to FIGS. 2, 6, 8A and 8B.

However, when the first coding unit includes the region that deviates from the boundary of the current picture, the apparatus 900 for encoding an image divides the first coding unit into second coding units and encodes only the second coding unit that does not deviate from the boundary of the current picture.

In other words, the apparatus 900 for encoding an image encodes the first coding unit by using different encoding methods depending on whether the first coding unit includes the region that deviates from the boundary of the current picture. Thus, the determiner 910 firstly determines whether the first coding unit includes the region that deviates from the boundary of the current picture. This will be described later with reference to FIGS. 10A and 10B.

Figure 10A:
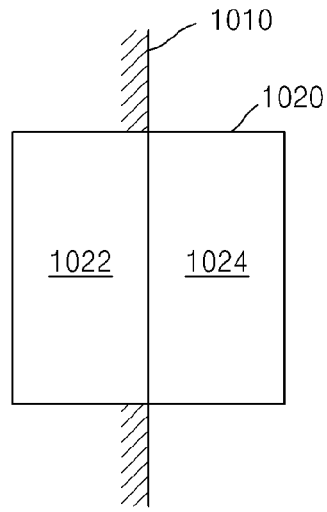
FIGS. 10A and 10B illustrate a coding unit of a picture boundary, according to an exemplary embodiment.
Figure 10B:
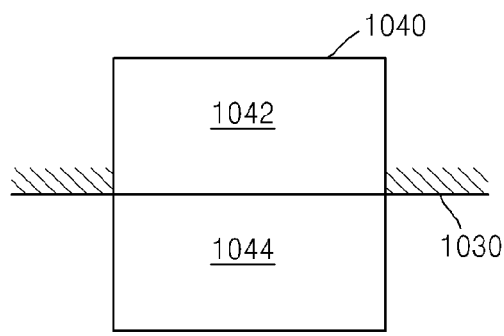

FIGS. 10A and 10B illustrate a coding unit of a picture boundary, according to an exemplary embodiment.

Referring to FIGS. 10A and 10B, a first coding unit 1020 extends over a boundary 1010 of a current picture. When the size of the current picture is not a multiple of the size of a maximum coding unit, for example, when the size of the maximum coding unit is set to 32×32 so as to encode the current picture and the width or height of the current picture is not a multiple of 32, the maximum coding unit may include a region 1024 that deviates from the boundary 1010 of the current picture Likewise, the first coding unit 1040 may include a region 1044 that deviates from a boundary 1030 of the current picture, as illustrated in FIG. 10B. In FIG. 10A, a left side of the boundary 1010 of the current picture is an internal region of the current picture, and a right side of the boundary 1010 of the current picture is an external region of the current picture. In FIG. 10B, an upper portion of the boundary 1030 of the current picture is an internal region of the current picture, and a lower portion of the boundary 1030 of the current picture is an external region of the current picture.

FIGS. 10A and 10B illustrate a case where the first coding unit 1020 or 1040 extends over the right and lower boundaries of the current picture. However, the first coding unit 1020 or 1040 may also extend over the left and upper boundaries of the current picture.

The determiner 910 compares the boundary of the first coding unit 1020 or 1040 with the boundary of the current picture so as to determine whether the first coding unit 1020 or 1040 includes the region that deviates from the boundary 1010 or 1030 of the current picture.

When the right boundary of the first coding unit 1020 deviates from the right boundary of the current picture or the left boundary of the first coding unit 1020 deviates from the left boundary of the current picture, the determiner 910 may determine that the first coding unit 1020 includes the region that deviates from the boundary 1010 of the current picture. In addition, when the lower boundary of the first coding unit 1040 deviates from the lower boundary of the current picture or the upper boundary of the first coding unit 1040 deviates from the upper boundary of the current picture, the determiner 910 may determine that the first coding unit 1040 includes the region that deviates from the boundary 1030 of the current picture.

Referring back to FIG. 9, when the determiner 910 determines that the first coding unit 1020 or 1040 includes the region that deviates from the boundary 1010 or 1030 of the current picture, the controller 920 divides the first coding unit 1020 or 1040 into second coding units.

The apparatus for encoding an image 900 according to an exemplary embodiment may encode and decode an image by using the hierarchical coding units described above. The apparatus for encoding an image 900 may encode and decode an image by dividing the maximum coding unit into sub coding units having predetermined depths. In this regard, the depths indicate degrees of stepwise decreasing from the size of the maximum coding unit to the size of a predetermined sub coding unit.

The controller 920 divides the first coding unit 1020 into second coding units according to the depths. For example, when the first coding unit 1020 is a maximum coding unit having a depth of 0, the controller 920 may divide the first coding unit 1020 into at least one coding unit having a depth of 1. The controller 920 may also divide the first coding unit 1020 into a coding unit having a larger depth than the coding unit having a depth of 1, i.e., into a coding unit having a depth of 2 or more. This will be described in detail below with reference to FIGS. 11A and 11B.

Figure 11A:
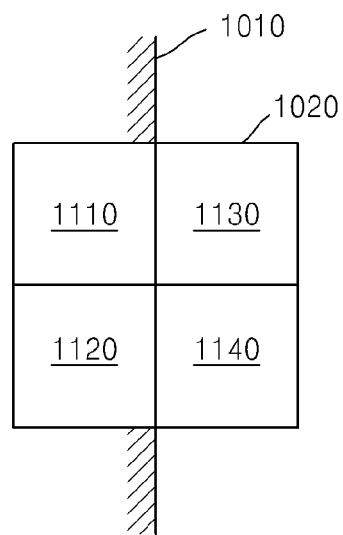
FIGS. 11A and 11B illustrate a method of dividing a coding unit of a picture boundary, according to an exemplary embodiment.
Figure 11B:
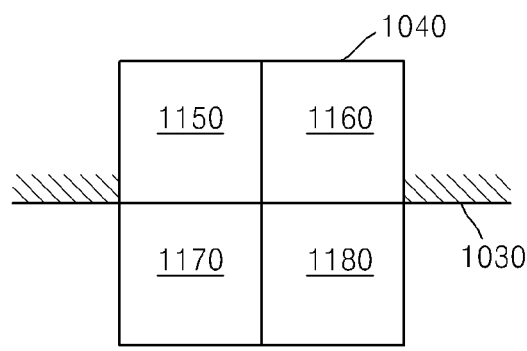

FIGS. 11A and 11B illustrate a method of dividing a coding unit of a picture boundary, according to an exemplary embodiment.

FIG. 11A illustrates a case where the first coding unit 1020 illustrated in FIG. 10A is divided into second coding units 1110, 1120, 1130, and 1140. When the first coding unit 1020 extends over the picture boundary, the first coding unit 1020 includes the region 1024 that deviates from the boundary of the current picture, as described with reference to FIG. 10A.

The first coding unit 1020 is divided into second coding units 1110, 1120, 1130, and 1140 having different depths and is distinguished from the second coding units 1110 and 1120 in the region that does not deviate from the boundary of the current picture and is distinguished from the second coding units 1130 and 1140 in the region that deviates from the boundary of the current picture.

FIG. 11B illustrates a case where the first coding unit 1040 illustrated in FIG. 10B is divided into second coding units 1150, 1160, 1170, and 1180.

The first coding unit 1040 is divided into second coding units 1150, 1160, 1170, and 1180 having different depths and is distinguished from the second coding units 1150 and 1160 in the region that does not deviate from the boundary of the current picture and is distinguished from the second coding units 1170 and 1180 in the region that deviates from the boundary of the current picture.

FIGS. 11A and 11B illustrate a case where, when the first coding unit 1020 or 1040 is divided into four second coding units having the same size, the first coding unit 1020 or 1040 may be distinguished from second coding units in the region that does not deviate from the boundary of the current picture and distinguished from second coding units in the region that deviates from the boundary of the current picture. However, even when the first coding unit 1020 or 1040 is divided into four second coding units having the same size, the first coding unit 1020 or 1040 may not be distinguished from second coding units in the region that does not deviate from the boundary of the current picture or distinguished from the region that deviates from the boundary of the current picture. This will be described with reference to FIGS. 12A and 12B in detail.

Figure 12A:
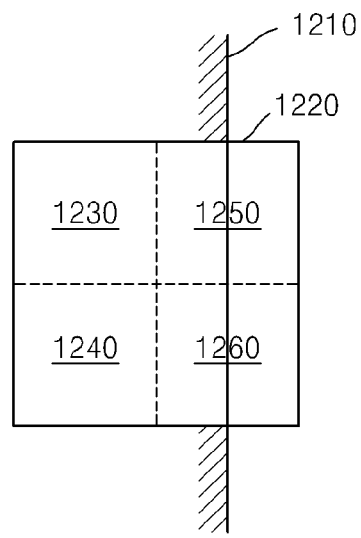
FIGS. 12A and 12B illustrate a method of dividing a coding unit of a picture boundary, according to another exemplary embodiment.
Figure 12B:
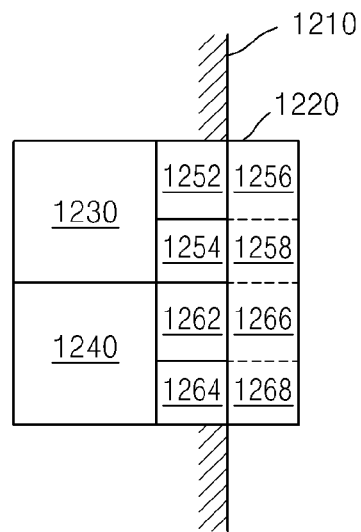

FIGS. 12A and 12B illustrate a method of dividing a coding unit of a picture boundary, according to another exemplary embodiment.

As illustrated in FIG. 12A, when the first coding unit 1220 is positioned at the picture boundary, even when the first coding unit 1220 is divided into second coding units 1230, 1240, 1250, and 1260, the first coding unit 1220 may not be distinguished from second coding units in the region that deviates from the boundary of the current picture or distinguished from second coding units in the region that does not deviate from the boundary of the current picture. The reason for this is that the second coding units 1250 and 1260 still include the region that deviates from the boundary of the current picture and the region that does not deviate from the boundary of the current picture.

Thus, when the first coding unit 1220 is positioned at the picture boundary, the first coding unit 1220 is repeatedly divided, as illustrated in FIG. 12A. In FIG. 12A, the second coding units 1250 and 1260 are further divided to generate third coding units 1252 through 1258 and 1262 through 1268.

By further dividing the second coding units 1250 and 1260 into third coding units having smaller sizes than those of the second coding units 1250 and 1260, the first coding unit 1220 may be distinguished from the coding units 1230, 1240, 1252, 1254, 1262, and 1264 in the region that does not deviate from the boundary of the current picture and distinguished from the coding units 1256, 1258, 1266, and 1268 in the region that deviates from the boundary of the current picture.

Referring back to FIG. 9, when the first coding unit 1020, 1040 or 1220 is divided by the controller 920 to be distinguished from coding units in the region that deviates from the boundary of the current picture and distinguished from coding units in the region that does not deviate from the boundary of the current picture, as illustrated in FIGS. 11A, 11B, and 12B, the encoder 930 encodes only coding units that are in the region that does not deviate from the boundary of the current picture, from among the coding units generated by dividing the first coding unit.

When the first coding unit does not include the region that deviates from the boundary of the current picture, all first coding units are encoded. The apparatus for encoding an image 900 may also perform prediction and frequency transformation, for example, DCT, without dividing the first coding unit or may also divide the first coding unit into a plurality of coding units according to a predetermined depth, as described above with reference to FIGS. 2, 6, 8A and 8B.

However, when the first coding unit includes the region that deviates from the boundary of the current picture, only pixel values of the region that does not deviate from the boundary of the current picture are encoded according to the division result of the controller 920.

The second coding units 1110 and 1120 positioned at the left side of FIG. 11A are encoded, and the second coding units 1150 and 1160 positioned at the upper portion of FIG. 11B are encoded. The second coding units 1230 and 1240 positioned at the left side of FIG. 12B and the third coding units 1252, 1254, 1262, and 1264 positioned at the left side of FIG. 12B are encoded. The coding unit that does not deviate from the boundary of the current picture is predicted based on a predetermined prediction unit, and residual values generated according to the result of prediction are transformed based on a predetermined transformation unit.

The apparatus for encoding an image 900 according to an exemplary embodiment may encode only pixel values that do not deviate from the boundary of the current picture, from among first pixel units positioned at the picture boundary, so that a compression ratio may be prevented from being lowered by encoding of unnecessary pixel values that deviate from the boundary of the current picture.

Also, information about division of the encoder 930, for example, flag information that indicates division of the encoder 930 may be optionally encoded. When the first coding unit extends over the picture boundary, the first coding unit is divided by the controller 920. Since division is necessary for encoding only pixel values of a region that does not deviate from the boundary of the current picture, information about division of the first coding unit does not need to be encoded. The reason for this is that, even when information about division of the encoder 930 is not separately encoded, a decoder may know that the first coding unit is divided. However, according to another exemplary embodiment, even when division of the first coding unit is necessary, information about division of the encoder 930 may also be separately encoded.

However, since the encoder 930 does not encode pixel values in the region that deviates from the boundary of the current picture by using the method of encoding an image described above, the first coding unit that extends over the boundary of the current picture may not be used in prediction of other coding units. This will be described in detail with reference to FIGS. 13A and 13B.

Figure 13A:
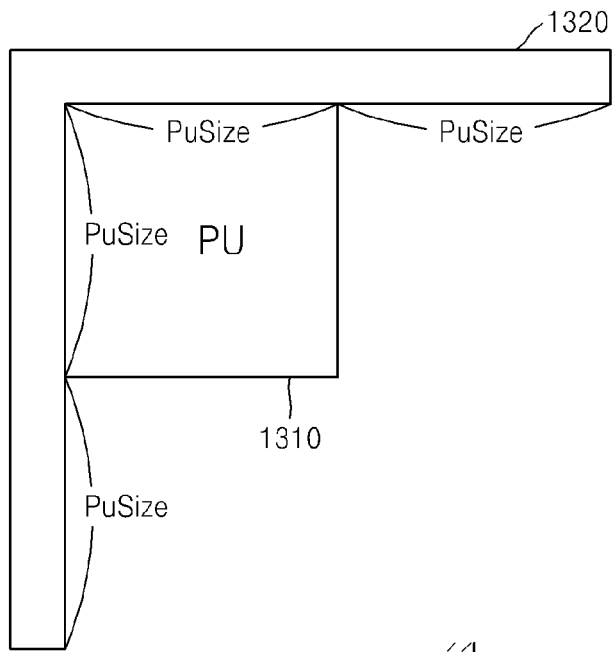
FIGS. 13A and 13B illustrate an intra prediction method according to an exemplary embodiment.
Figure 13B:
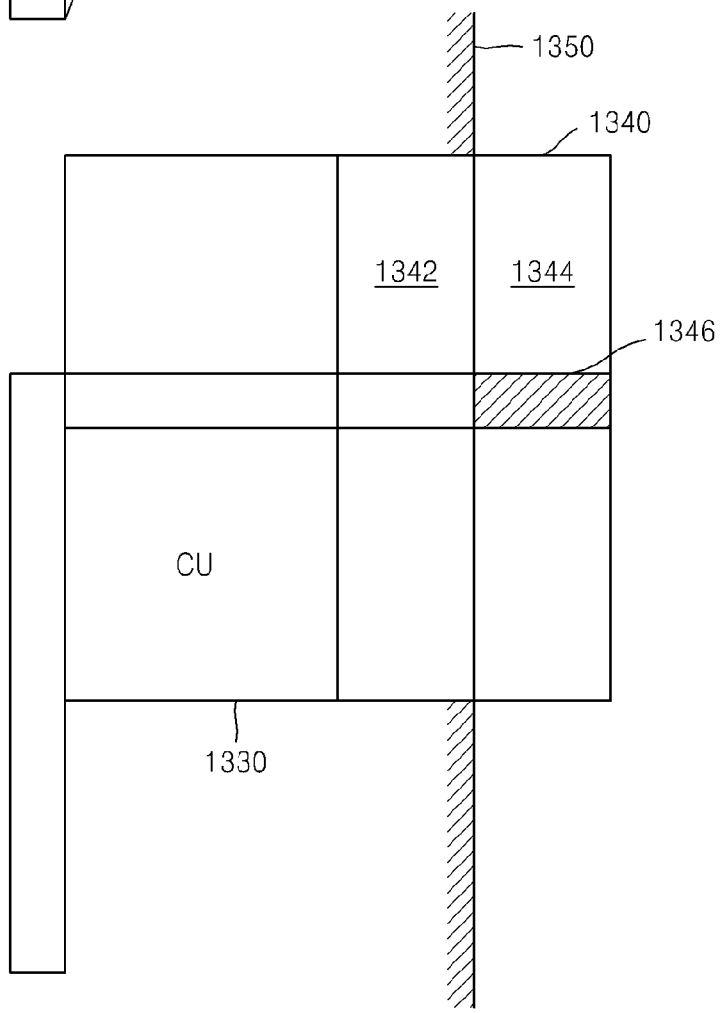

FIGS. 13A and 13B illustrate an intra prediction method according to an exemplary embodiment.

Referring to FIG. 13A, in the intra prediction method according to the current exemplary embodiment, when a predetermined prediction unit 1310 is intra-predicted, adjacent pixel values 1320 that have been previously encoded may be used. In particular, in intra prediction according to the current exemplary embodiment, pixels having a height of 'PuSize' may be further used in a lengthwise direction of the lower-left side of the prediction unit 1310.

In the method of encoding an image, according to the exemplary embodiments, the image is encoded using the hierarchical coding unit, as illustrated in FIG. 8A. Thus, intra prediction may be performed using pixels that are adjacent to the left side of the prediction unit 1310 as well as pixels that are adjacent to the lower-left side of the prediction unit 1310. For example, when a sub coding unit 830 illustrated in FIG. 8A is intra-predicted, intra prediction may be performed using pixels that are adjacent to the left side and the lower-left side of the sub coding unit 830, i.e., pixels included in a sub coding unit 828, as well as pixels that are adjacent to the upper portion and upper-right side of the sub coding unit 830, i.e., pixels included in the sub coding unit 812.

However, pixels that are adjacent to the upper-right side and the lower-left side of a coding unit may be unavailable. When a coding unit 1330 is encoded, as illustrated in FIG. 13B, some pixel values 1346 among pixel values that are adjacent to the upper-right side of the coding unit 1330 may not be used. The reason for this is that, when a coding unit 1340 that is positioned at the upper-right side of the coding unit 1340 is encoded, a coding unit 1344 in a region that deviates from a boundary 1350 of the current picture is not encoded. Thus, adjacent pixels that may be used in intra prediction of the coding unit 1330 may be only pixels that are adjacent to the upper portion, the left side, and the lower-left side of the coding unit 1330.

The encoder 930 determines whether 'cux+cuSize+cuSize' is larger than 'Frame_width' described above, so as to determine whether pixels that are adjacent to the upper-right side of the coding unit 1330 may be used. 'cux' is an X-coordinate of the left boundary of the coding unit 1330, and 'cuSize' is a width and a height of the coding unit 1330, and 'Frame_width' is a width of the current picture.

Also, the encoder 930 determines whether 'cuy+cuSize+cuSize' is larger than 'Frame_height' described above, so as to determine whether pixels that are adjacent to the lower-left side of the coding unit 1330 may be used. 'cuy' is an Y-coordinate of the upper boundary of the coding unit 1330, and 'cuSize' is a width and a height of the coding unit 1330, and 'Frame_height' is a height of the current picture.

The encoder 930 may encode information about an encoding method, i.e., information about an encoding mode, based on whether the first coding unit includes the region that deviates from the boundary of the current picture. When the first coding unit includes the region that deviates from the boundary of the current picture, the encoder 930 may encode information about an encoding mode so that the first encoding mode may indicate a second encoding mode.

The case where information about a prediction mode in the first coding unit is encoded will be described with reference to FIGS. 18A through 18G.

FIGS. 18A through 18G illustrate prediction modes in a first coding unit having a size of 2N×2N including a region that deviates from the boundary of the current picture.

Hatched portions of FIGS. 18A through 18H indicate regions that deviate from the boundary of the current picture.

Figure 18A:
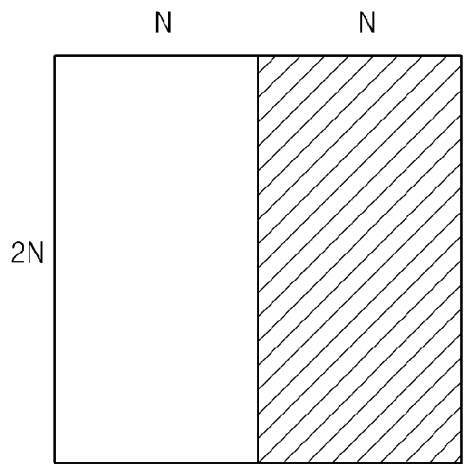
FIGS. 18A through 18G illustrate prediction modes in a first coding unit including a region that deviates from a boundary of a current picture.

Referring to FIG. 18A, a right N×2N region of a first coding unit having the size of 2N×2N is the region that deviates from the boundary of the current picture. When the encoder 930 encodes the first coding unit illustrated in FIG. 18A and selects a prediction mode in the first coding unit having the size of 2N×2N, prediction is not performed in the region that deviates from the boundary of the current picture. Thus, the encoder 930 performs prediction in a N×2N prediction mode.

In other words, even when the encoder 930 sets the prediction mode of the first coding unit to a 2N×2N prediction mode, prediction is performed in the same manner as the manner in which the prediction mode of the first coding unit is set to a N×2N prediction mode. Thus, the N×2N does not need to be separately set, and information about the 2N×2N prediction mode may be used as information about the N×2N prediction mode. This is the same as the effect that the type of a prediction mode is decreased. Thus, the encoder 930 may decrease the number of bits that are necessary for encoding the information about the prediction mode.

Figure 18B:
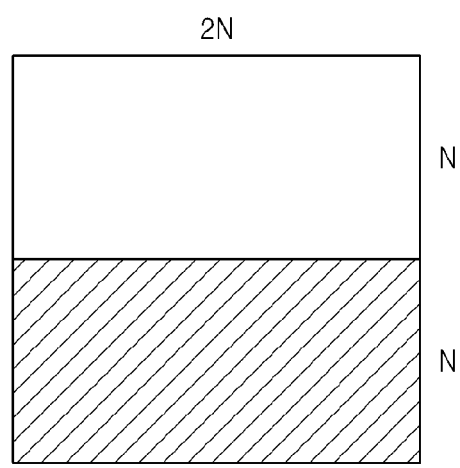

Likewise, in FIG. 18B, the encoder 930 may replace a 2N×N prediction mode by setting the prediction mode of the first coding unit to the 2N×2N prediction mode.

Figure 18C:
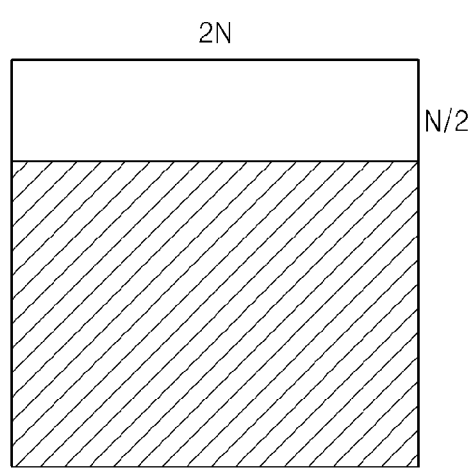

In FIG. 18C, the encoder 930 may replace a 2N×N/2 prediction mode by setting the prediction mode of the first coding unit to the 2N×2N prediction mode. In FIG. 18C, the height of a predicted region is decreased by ½ compared to FIG. 18B. However, like in FIG. 18B, prediction is performed only in the region that does not deviate from the boundary of the current picture. Thus, a 2N×N/2 prediction mode may be replaced by setting the prediction mode of the first coding unit to the 2N×2N prediction mode.

Figure 18D:
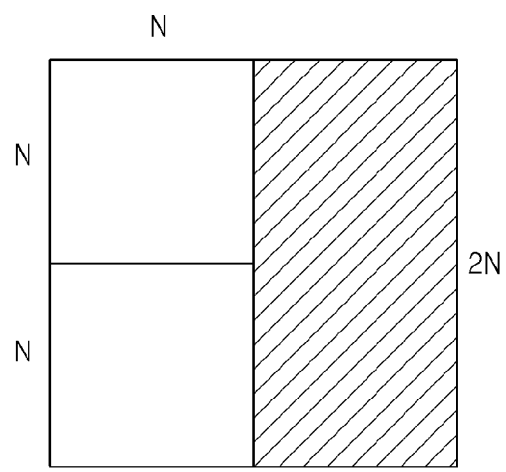

In FIG. 18D, the encoder 930 may replace the 2N×N prediction mode by setting the prediction mode of the first coding unit to a N×N prediction mode. When the first coding unit illustrated in FIG. 18D is predicted in the 2N×N prediction mode and the right half of the first coding unit is included in the region that deviates from the boundary of the current picture, the first coding unit having a size of N×N is predicted like in the N×N prediction mode. Thus, the 2N×N prediction mode may be replaced with the N×N prediction mode.

Figure 18E:
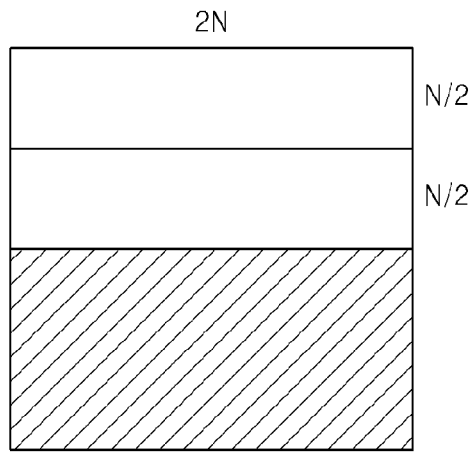

In FIG. 18E, the encoder 930 may replace the 2N×N/2 prediction mode by setting the prediction mode of the first coding unit to the 2N×N prediction mode. Prediction is performed based on two prediction units whose heights are decreased by ½ compared to FIG. 18B. Thus, the prediction mode of the first coding unit may be set to the 2N×N prediction mode whose height is decreased by ½ from the 2N×2N prediction mode set in FIG. 18B.

Figure 18F:
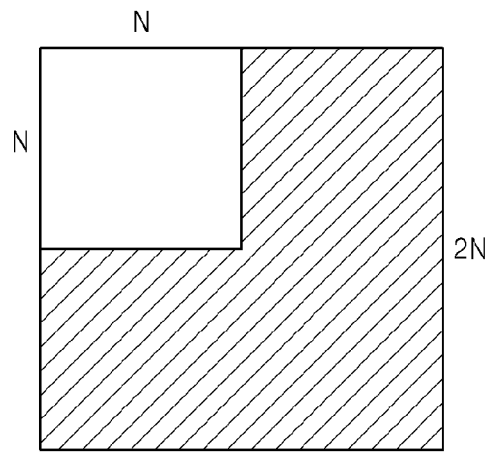

In FIG. 18F, the encoder 930 may replace the N×N prediction mode by setting the prediction mode of the first coding unit to the 2N×2N prediction mode. Prediction of the first coding unit illustrated in FIG. 18F is also performed only in the region that does not deviate from the boundary of the current picture, like in FIGS. 18A, 18B, and 18C. Thus, the N×N prediction mode may be replaced by setting the prediction mode of the first coding unit to the 2N×2N prediction mode.

Figure 18G:
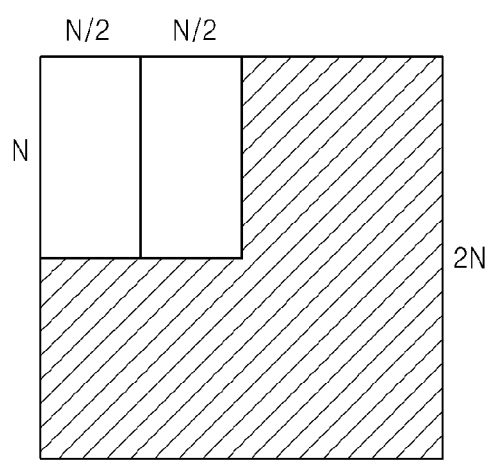

In FIG. 18G, the encoder 930 may replace the N/2×N prediction mode by setting the prediction mode of the first coding unit to the N×2N prediction mode. Prediction is performed based on two prediction units whose widths are decreased by ½ compared to FIG. 18F. Thus, the prediction mode in the first coding unit may be set to the N×2N prediction mode whose width is decreased by ½ from the 2N×2N prediction mode set in FIG. 18B.

Encoding by the apparatus 900 for encoding an image described above with reference to FIGS. 9 through 13 may be performed with the following programming syntax.

```
UInt uiLPelX
UInt uiRPelX
UInt uiTPelY
UInt uiBPelY
    if( !(( uiRPelX < pcCU->getSlice( )->getWidth( ) ) && ( uiBPelY <
pcCU->getSlice( )->getHeight( ) ) ))
    {
        go_next_depth_process( );
    }
```

Referring to the programming syntax, a X-coordinate of a left boundary, an X-coordinate of a right boundary, an Y-coordinate of an upper boundary, and a lower Y-coordinate of a lower boundary of the first coding unit are obtained by using functions, such as 'UInt uiLPeLX', 'UInt uiRPeLX', 'UInt uiTPeLY', and 'UInt uiBPeLY', and the width and height of the current picture are obtained using 'pcCU→getSlice( )→getWidth( )' and pcCU→getSlice( )→getHeight( )'.

Then, the X-coordinate of a left boundary of the first coding unit and the width of the current picture are compared to each other, and the Y-coordinate of a lower boundary of the first coding unit and the height of the current picture are compared to each other. When the X-coordinate of a left boundary of the first coding unit is larger than the width of the current picture or the Y-coordinate of the lower boundary of the first coding unit is larger than the height of the current picture, by calling a function 'go_next_depth_process( )', the first coding unit is divided into a second coding unit having a next depth, i.e., a depth of 'k+1' that is larger than a depth 'k' of the first coding unit, and only the second coding unit that does not deviate from the boundary of the current picture is encoded.

However, even when the apparatus 900 for encoding an image encodes only the region that does not deviate from the boundary of the current picture, as illustrated in FIGS. 9 through 13, an address of a maximum encoding unit is set on the assumption that the region that deviates from the boundary of the current picture is also encoded. This will be described with reference to FIG. 14 in detail.

Figure 14:
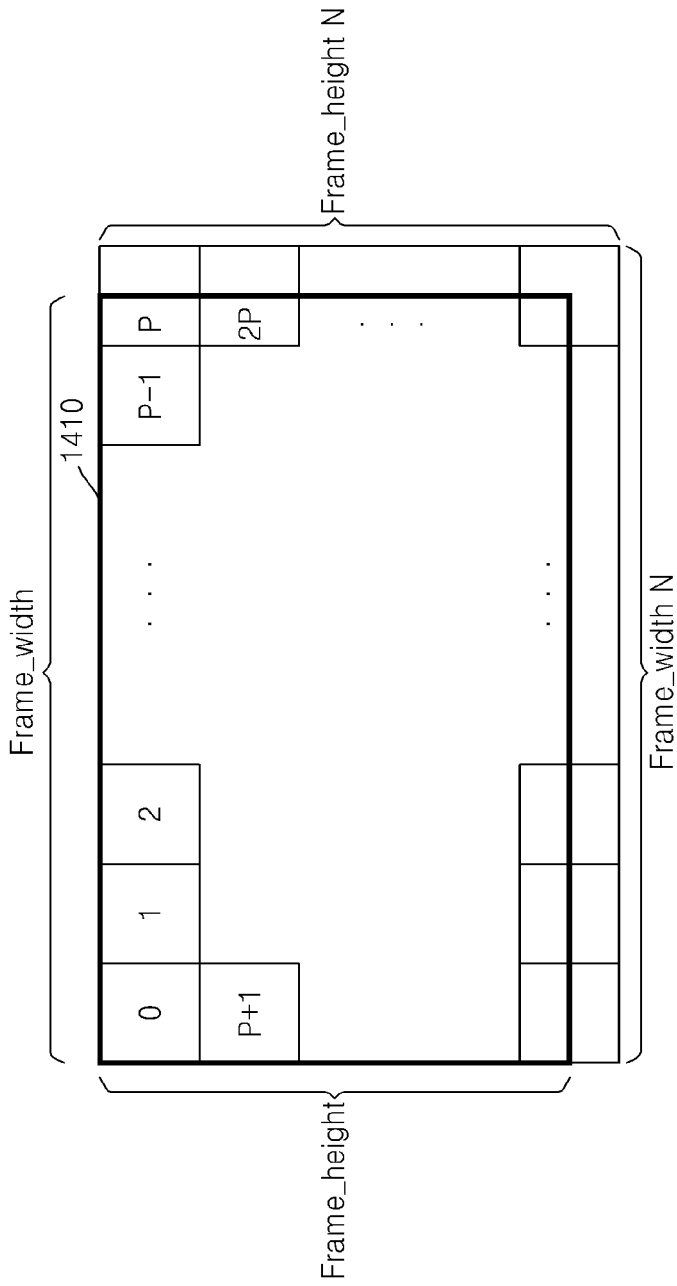
FIG. 14 illustrates indexing of a maximum coding unit, according to an exemplary embodiment.

FIG. 14 illustrates indexing of a maximum coding unit, according to an exemplary embodiment.

Referring to FIG. 14, when a current picture 1410 is divided into the maximum coding unit having a predetermined size and is encoded, if the width of the current picture 1410 'Frame_width' and the height thereof 'Frame_height' are not a multiple of a width of the maximum coding unit, maximum coding units extend over the right and lower boundaries of the current picture 1410, as illustrated in FIG. 14.

In FIGS. 9 through 13, when the apparatus 900 for encoding an image encodes the maximum coding unit that extends over the boundary of the current picture, encoding is performed only in the region that does not deviate from the boundary of the current picture. However, when the address of the maximum coding unit is set, the address of the maximum coding is based not on 'Frame_width' and 'Frame_height' but on 'Frame_widthN' and 'Frame_heightN'. In other words, the address of the maximum coding unit is set by assigning an address to a maximum coding unit that extends over the right boundary and the lower boundary of the current picture.

For example, a maximum coding unit that is positioned at the rightmost portion of a first row extends over the right boundary of the current picture, encoding is performed only in the region that does not deviate from the boundary of the current picture, and 'P' is assigned to the maximum coding unit as an address. Thus, an address of a maximum coding unit that is positioned at the leftmost portion of a second row is 'P+1'. 'Frame_widthN' and 'Frame_heightN' may be calculated as follows.

If Frame_width % LcuSize not equal to 0,
Frame_widthN=(Frame_width/LcuSize+1)*LcuSize
If Frame_height % LcuSize not equal to 0,
Frame_heightN=(Frame_height/LcuSize+1)*LcuSize In the above calculation, 'Frame_width % LcuSize' represents a remainder that is obtained by dividing 'Frame_width' by 'LcuSize', and 'Frame_height % LcuSize' represents a remainder that is obtained by dividing 'Frame_height' by 'LcuSize'. 'Frame_width/LcuSize' represents a quotient that is obtained by dividing 'Frame_width' by 'LcuSize', and 'Frame_height/LcuSize' represents a quotient that is obtained by dividing 'Frame_height' by 'LcuSize'. 'LcuSize' represents a width and a height of a maximum coding unit when the maximum coding unit has a perfect rectangular shape.

Figure 15:
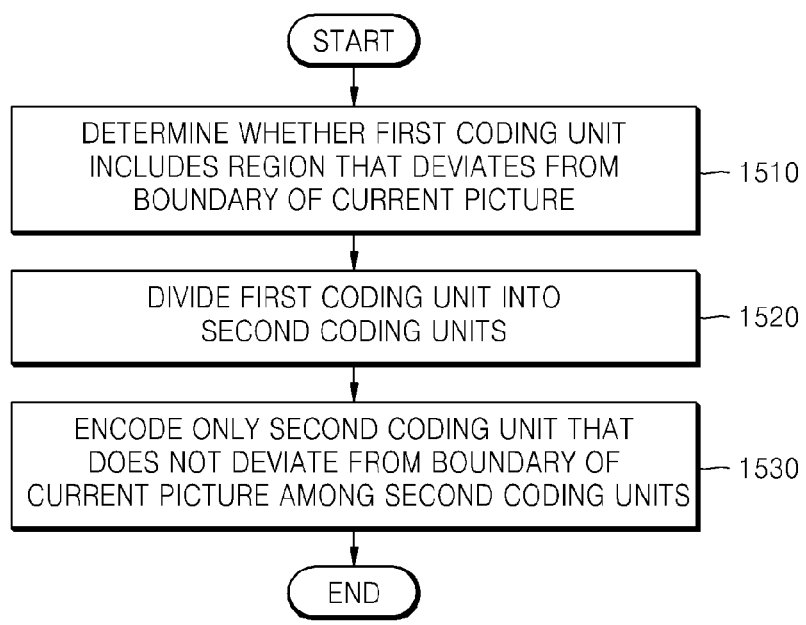
FIG. 15 is a flowchart illustrating a method of encoding an image, according to an exemplary embodiment.

FIG. 15 is a flowchart illustrating a method of encoding an image, according to an exemplary embodiment.

Referring to FIG. 15, in Operation 1510, the apparatus 900 for encoding an image determines whether a first coding unit includes a region that deviates from a boundary of a current picture. Since the first coding unit extends over a picture boundary, as illustrated in FIGS. 10A, 10B, and 12A, the apparatus 900 for encoding an image determines whether the first coding unit includes the region that deviates from the boundary of the current picture. In order to determine whether the first coding unit includes the region that deviates from the boundary of the current picture, the boundary of the current picture and a boundary of the first coding unit are compared to each other. The apparatus 900 for encoding an image determines whether the left or right boundary of the first coding unit deviates from the left or right boundary of the current picture or whether the upper or lower boundary of the first coding unit deviates from the upper or lower boundary of the current picture.

In Operation 1520, the apparatus 900 for encoding an image divides the first coding unit to obtain second coding units based on the result of determination in Operation 1510. The apparatus 900 for encoding an image may divide the first coding unit to obtain the second coding units each having a depth of 'k+1' that is larger than a depth of 'k' of the first coding unit. Although the first coding unit has been divided to obtain the second coding unit, if it is determined again that the second coding unit includes the region that deviates from the picture boundary, the first coding unit is divided until a coding unit generated by repeated division does not include the region that deviates from the picture boundary.

In Operation 1530, the apparatus 900 for encoding an image encodes only the second coding unit that does not deviate from the picture boundary among the second coding units generated as a result of division in Operation 1520. The apparatus 900 for encoding an image predicts the second coding units, generates residual values and performs transformation, quantization, and entropy encoding on the residual values. Also, since division of the first coding unit that extends over the picture boundary is necessary in the apparatus 900 for encoding an image, the apparatus 900 for encoding an image may not encode information about division of the first coding unit.

In addition, the apparatus 900 for encoding an image may encode information about an encoding mode encoded depending on whether the first coding unit includes the region that deviates from the picture boundary, as described above with reference to FIGS. 18A through 18G.

Figure 16:
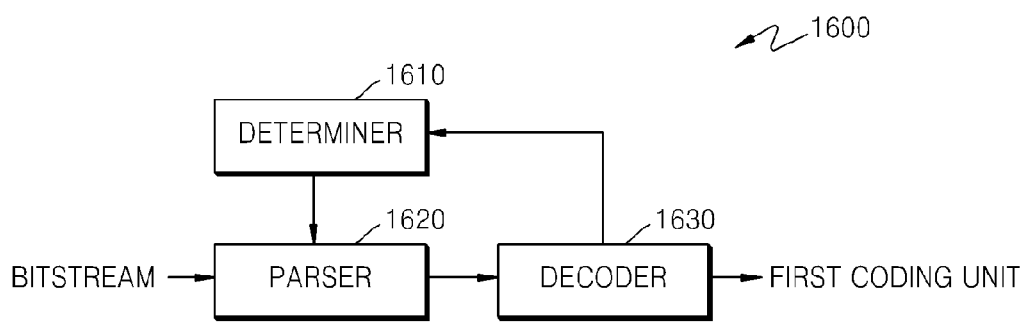
FIG. 16 is a block diagram of an apparatus for decoding an image, according to another exemplary embodiment.

FIG. 16 is a block diagram of an apparatus for decoding an image 1600 according to another exemplary embodiment.

Referring to FIG. 16, the apparatus 1600 for decoding an image according to the current exemplary embodiment includes a determiner 1610, a parser 1620, and a decoder 1630.

The determiner 1610 determines whether a first coding unit to be decoded includes a region that deviates from a boundary of a current picture. The determiner 1610 may determine whether the first coding unit to be decoded comprises the region that deviates from the boundary of the current picture based on a coding unit that has been previously decoded. For example, in FIG. 14, when the coding unit that has been immediately decoded is a 'P−1' coding unit, since the first coding unit to be decoded extends over the boundary of the current picture, the determiner 1610 may determine that the first coding unit includes the region that deviates from the boundary of the current picture.

In other words, the determiner 1610 determines whether the left and right boundary of the first coding unit to be currently decoded deviates from the left or right boundary of the current picture or whether the upper or lower boundary of the first coding unit deviates from the upper or lower boundary of the current picture, thereby determining whether the first coding unit to be decoded extends over the boundary of the current picture.

The parser 1620 receives an image bitstream and parses only data regarding a second coding unit that does not deviate from the picture boundary among second coding units generated by dividing the first coding unit, if it is determined that the first coding unit includes the region that deviates from the boundary of the current picture. The second coding unit may be a coding unit having a depth of 'k+1' that is larger than a depth of 'k' of the first coding unit. Also, if it is determined that the first coding unit does not include the region that deviates from the picture boundary, the parser 1620 parses all data regarding the first coding unit.

When it is determined that the first coding unit includes the region that deviates from the picture boundary and the parser 1620 parses only data regarding the second coding unit that does not deviate from the picture boundary, information about division of the first coding unit, for example, flag information may not be parsed. When division of the first coding unit that extends over the picture boundary is necessary and information about division of the first coding unit is not encoded, there is no information to be parsed, and information about division of the first coding unit does not need to be parsed.

However, if it is determined that the first coding unit includes the region that deviates from the picture boundary, division of the first coding unit is necessary and information about the division of the first coding unit is separately encoded, and information about the division of the first coding unit may be parsed.

Since only the residual values of the second coding unit that does not deviate from the picture boundary are encoded, only data regarding the second coding unit that does not deviate from the picture boundary among the second coding units generated by dividing the first coding unit is parsed regardless of parsing the information about division of the first coding unit.

The decoder 1630 decodes data regarding the second coding unit that does not deviate from the boundary of the current picture parsed by the parser 1620. The decoder 1630 performs entropy decoding, inverse-quantization, and inverse transformation, for example, inverse-DCT, on the data regarding the second coding unit that does not deviate from the boundary of the current picture so as to restore the residual values and adds a prediction value that is generated by performing intra or inter prediction on the second coding unit to the restored residual values so as to restore the second coding unit.

A method of setting an address of the coding unit that is used in decoding is the same as that of FIG. 14, and adjacent pixels that may be used for intra prediction during decoding are the same as those of FIGS. 13A and 13B.

Information about an encoding mode of the first coding unit that is used when the decoder 1630 performs decoding may be information about an encoding mode encoded depending on whether the first coding unit includes the region that deviates from the boundary of the current picture, as described above with reference to FIGS. 18A through 18G.

Figure 17:
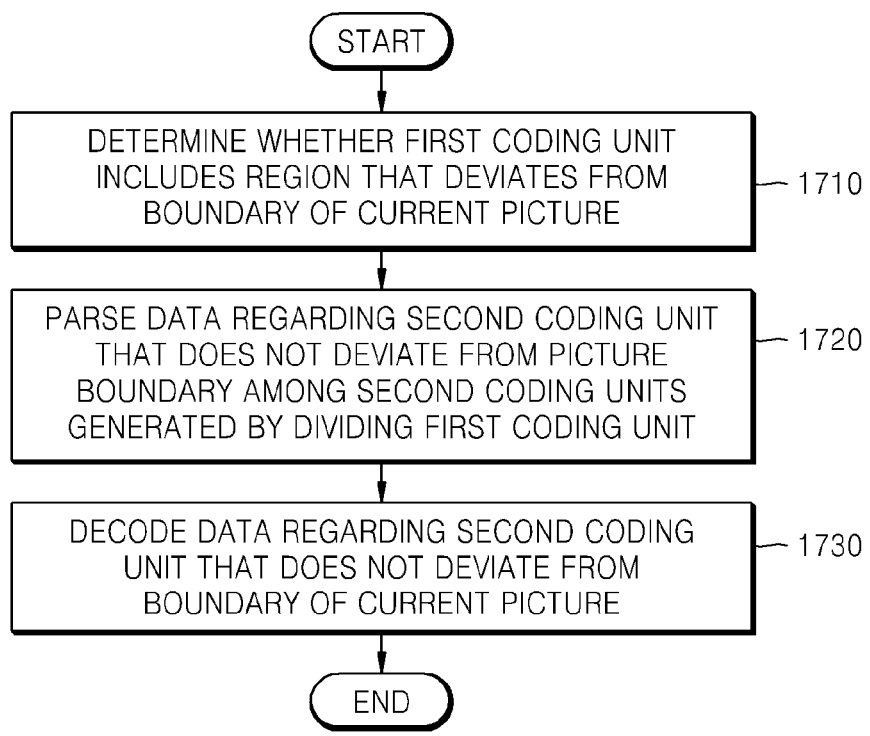
FIG. 17 is a flowchart illustrating a method of decoding an image, according to an exemplary embodiment.

FIG. 17 is a flowchart illustrating a method of decoding an image, according to an exemplary embodiment.

Referring to FIG. 17, in Operation 1710, the apparatus 1600 for decoding an image determines whether a first coding unit to be decoded includes a region that deviates from a boundary of a current picture. The apparatus 1600 for decoding an image determines whether the right or left boundary of the first coding unit deviates from the right or left boundary of the current picture or whether the upper or lower boundary of the first coding unit deviates from the upper or lower boundary of the current picture by referring to the coding unit that has been previously decoded.

In Operation 1720, the apparatus 1600 for decoding an image parses data regarding a second coding unit that does not deviate from the picture boundary among second coding units generated by dividing the first coding unit based on the result of determination in Operation 1710. If it is determined in Operation 1710 that the first coding unit includes the region that deviates from the boundary of the current picture, data regarding a second coding unit that does not deviate from the picture boundary among second coding units generated by dividing the first coding unit is parsed. As described above, the second coding unit may be a coding unit having a depth of 'k+1' that is larger than a depth of 'k' of the first coding unit.

In Operation 1730, the apparatus 1600 for decoding an image decodes only data regarding the second coding unit that does not deviate from the boundary of the current picture parsed in Operation 1720. The apparatus 1600 for decoding an image performs entropy decoding, inverse-quantization, and inverse transformation on the data regarding the second coding unit that does not deviate from the picture boundary so as to restore the residual values and adds prediction values that are generated as a result of prediction to the restored residual values so as to restore the second coding unit.

Information about an encoding mode of the first coding unit that is used when the apparatus 1600 for decoding an image performs decoding may be information about an encoding mode encoded depending on whether the first coding unit includes the region that deviates from the boundary of the current picture, as described above with reference to FIGS. 18A through 18G.

Figure 19:
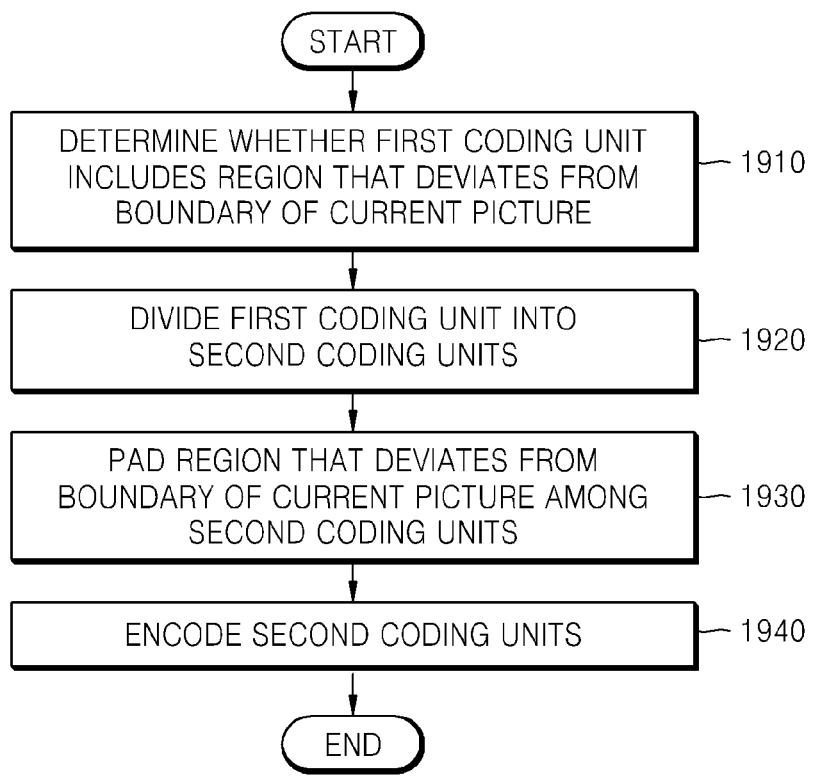
FIG. 19 is a flowchart illustrating a method of encoding an image, according to another exemplary embodiment.

FIG. 19 is a flowchart illustrating a method of encoding an image, according to another exemplary embodiment.

Referring to FIG. 19, in Operation 1910, the apparatus 900 for encoding an image determines whether a first coding unit includes a region that deviates from a boundary of a current picture.

In Operation 1920, the apparatus 900 for encoding an image divides a first coding unit into second coding units based on a result of the determination in Operation 1910. The first coding unit may be divided into a second coding unit having a depth of 'k+1' that is larger than a depth of 'k' of the first coding unit.

In Operation 1930, the apparatus 900 for encoding an image pads a region that deviates from the boundary of the second coding units generated as a result of the division in Operation 1920 with predetermined values. This will be described with reference to FIGS. 20A and 20B in detail.

FIGS. 20A and 20B illustrate a method of encoding a coding unit of a picture boundary, according to an exemplary embodiment.

If the determiner 910 of the apparatus 900 for encoding an image determines that a first coding unit 2020 extends over the picture boundary, the controller 920 divides the first coding unit 2020 to obtain second coding units having a smaller size than that of the first coding unit 2020, i.e., second coding units having a larger depth than that of the first coding unit 2020. However, when the second coding unit is a minimum coding unit, the controller 920 cannot divide the second coding unit to obtain smaller coding units than the second coding unit and cannot divide the second coding unit any further. Thus, the second coding unit cannot be distinguished from a region that deviates from the picture boundary or a region that does not deviate from the picture boundary.

Thus, the encoder 930 pads the region that deviates from a boundary 2010 among second coding units 2024 and 2028, as illustrated in FIG. 20B. All of the pixel values of the region that deviates from the boundary 2010 of the current picture are set to be '0', or pixel values of the region that deviates from the boundary 2010 of the current picture are set to be the same as adjacent pixel values of a region that does not deviate from the boundary 2010 of the current picture.

Referring back to FIG. 19, in Operation 1940, the apparatus for encoding an image 900 encodes at least one second coding unit including a region padded in Operation 1930.

The encoder 930 of the apparatus 900 for encoding an image generates residual values by predicting second coding units 2022 through 2028 and performs frequency transformation on the residual values. The encoder 930 performs quantization and entropy coding on frequency transformation coefficients generated by performing frequency transformation, thereby encoding the second coding units 2022 through 2028.

When the second coding units 2024 and 2028 that extend over the boundary 2010 of the current picture are predicted, all of the second encoding units 2024 and 2028 may be predicted, or prediction may be performed only in a region that does not deviate from the boundary 2010 of the current picture. For example, when the second coding unit 2024 that extends over the boundary 2010 of the current picture is 8×8, the second coding unit 2024 may be predicted to have a size of 8×8 including the region that deviates from the boundary 2010 of the current picture or to have a size of 4×8 that does not include the region that deviates from the boundary 2010 of the current picture.

In addition, all of the second coding units 2024 and 2028 that extend over the boundary 2010 of the current picture may be transformed, or transformation may be performed only in a region that does not deviate from the boundary 2010 of the current picture.

For example, when a minimum coding unit 2024 that extends over the boundary 2010 of the current picture is 8×8, transformation may be performed with respect to a size of 8×8 including the region that deviates from the boundary 2010 of the current picture. When a region that deviates from the boundary 2010 is predicted, the region that deviates from the boundary 2010 of the current picture includes residual values. Thus, transformation may be performed with respect to a size of the second coding unit. When the region that deviates from the boundary 2010 of the current picture is not predicted and there are no residual values, the region that deviates from the boundary 2010 of the current picture may be set to an arbitrary residual value, for example, '0', and transformation may be performed in the size of the second coding unit. Since residual values in the region that deviates from the boundary 2010 of the current picture are meaningless regardless of prediction, transformation may be performed by setting the residual values in the region that deviates from the boundary 2010 of the current picture to arbitrary values having the highest efficiency in transformation.

The encoder 930 may also perform transformation with respect to a size of 4×8 excluding the region that deviates from the boundary 2010 of the current picture. As described above, according to the exemplary embodiments since the sizes of a coding unit, a prediction unit, and a transformation unit may be independently determined, transformation may be optionally performed only in the region that does not deviate from the boundary 2010 of the current picture by using a transformation unit having a smaller size than that of a minimum coding unit. As well as encoding the second coding unit in Operation 1940, the encoder 930 may encode information about an encoding mode encoded depending on whether the second coding unit includes the region that deviates from the boundary 2010 of the current picture, as described above with reference to FIGS. 18A and 18G.

Figure 21:
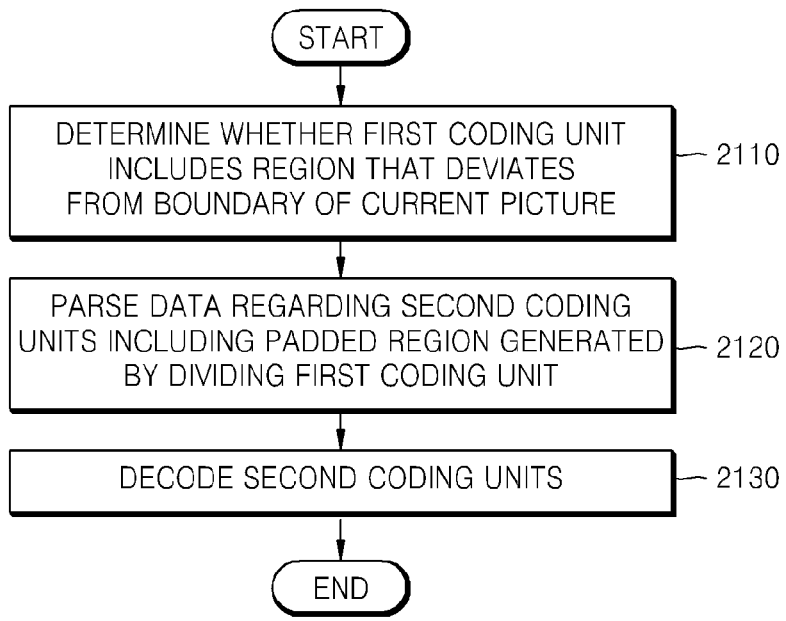
FIG. 21 is a flowchart illustrating a method of decoding an image, according to another exemplary embodiment.

FIG. 21 is a flowchart illustrating a method of decoding an image, according to another exemplary embodiment.

Referring to FIG. 21, in Operation 2110, the determiner 1610 of the apparatus 1600 for decoding an image determines whether a first coding unit includes a region that deviates from a boundary of a current picture.

In Operation 2120, the parser 1620 of the apparatus for decoding an image 1600 parses data regarding second coding units including a padded region among the second coding units generated by dividing the first coding unit based on a result of the determination in Operation 2110. As illustrated in FIG. 20A, when the second coding unit is a minimum coding unit and extends over the boundary of the current picture, some of the second coding unit is a region that deviates from the boundary of the current picture. The region may be padded with a predetermined value, as described above with reference to FIG. 19. Thus, the parser 1620 of the apparatus 1600 for decoding an image parses data regarding second coding units including the padded region.

In Operation 2130, the decoder 1630 of the apparatus 1600 for decoding an image decodes the second coding unit based on the data regarding the second coding unit parsed in Operation 2120. The decoder 1630 performs entropy decoding, inverse-quantization, and inverse transformation on the data regarding the parsed second coding unit so as to restore residual values, and adds prediction values generated as a result of prediction to the restored residual values so as to restore the second coding unit. The decoder 1630 may decode information about an encoding mode encoded depending on whether the second coding unit includes the region that deviates from the boundary of the current picture, as described above with reference to FIGS. 18A and 18G.

Like in transformation described with reference to FIG. 19, inverse transformation may be performed on all second encoding units or only in a region that does not deviate from the boundary of the current picture. Also, prediction may be performed on all second encoding units or only in the region that does not deviate from the boundary of the current picture.

Figure 22:
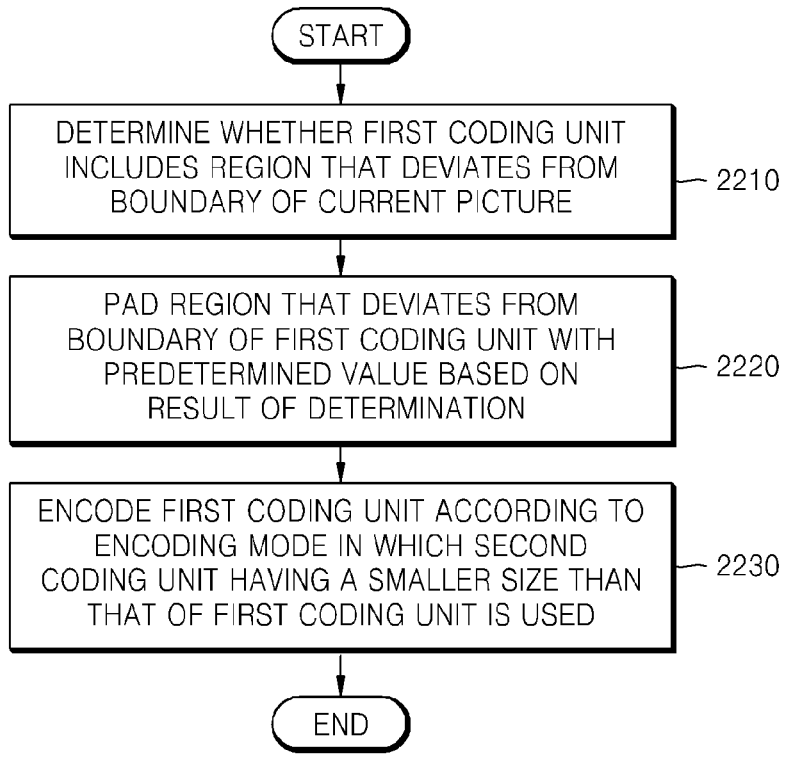
FIG. 22 is a flowchart illustrating a method of encoding an image, according to another exemplary embodiment.

FIG. 22 is a flowchart illustrating a method of encoding an image, according to another exemplary embodiment.

Referring to FIG. 22, in Operation 2210, the determiner 910 of the apparatus 900 for encoding an image determines whether a first coding unit includes a region that deviates from a boundary of a current picture.

In Operation 2220, the apparatus 900 for encoding an image pads a region that deviates from a boundary of the first coding unit based on a result of the determination in Operation 2210, with a predetermined value. This will be described in detail with reference to FIG. 23A.

FIGS. 23A and 23B illustrate a method of encoding a coding unit of a picture boundary, according to another exemplary embodiment.

Referring to FIG. 23A, when the determiner 910 of the apparatus 900 for encoding an image determines that a first coding unit 2320 extends over a boundary 2310 of a current picture, the encoder 930 pads a region 2322 that deviates from the boundary 2310 of the first coding unit 2320. All pixel values of a region that deviates from the boundary 2310 of the current picture are set to '0', or adjacent pixel values of the region that deviates from the boundary 2310 of the current picture are set to be the same as adjacent pixel values of a region that does not deviate from the boundary 2010 of the current picture.

Referring back to FIG. 22, in Operation 2230, the encoder 930 of the apparatus 900 for encoding an image encodes the first coding unit 2320 in which the region 2322 that deviates from the boundary 2310 of the first coding unit 2320 is padded in Operation 2220, in an encoding mode in which a second coding unit having a smaller size than that of the first coding unit 2320 is used. If a rule for a padding method is shared by an encoder and a decoder, the decoder may restore the padded region 2322 without encoding the padded region 2322 of the first coding unit 2320. Thus, for optional encoding of the second coding unit 2324 that does not deviate from the boundary 2310 of the first coding unit 2320, the encoder 930 of the apparatus 900 for encoding an image encodes the first coding unit 2320 in an encoding mode in which the second coding unit having a smaller size than that of the first coding unit 2320 is used. This will be described with reference to FIG. 23B in detail.

Referring to FIG. 23B, the encoder 930 encodes the first coding unit 2320 in an encoding mode in which second coding units 2322 through 2328 having smaller sizes than the size of the first coding unit 2320 are used. The encoder 930 predicts each of the second coding units 2322 through 2328 according to the encoding mode in which the second coding units 2322 through 2328 are used and performs frequency transformation on residual values generated according to a result of prediction. The encoder 930 performs quantization on transformation coefficients that are generated as a result of transformation and then performs entropy encoding thereon.

When each of the second coding units is encoded, prediction may be performed only on second coding units 2336 and 2338 of a region that does not deviate from the boundary 2310 of the first coding unit 2320, and second coding units 2336 and 2338 of the region that does not deviate from the boundary 2310 of the first coding unit 2320 may be encoded based on a result of the prediction. Residual values may be set to a predetermined value, for example, '0', without performing prediction on the second coding units 2332 and 2334 of the region that deviates from the boundary 2310 of the first coding unit 2320.

In addition, only information about a motion vector and a pixel value regarding the second coding units 2336 and 2338 of the region that does not deviate from the boundary 2310 of the first coding unit 2320 may be encoded, and information about a motion vector and a pixel value regarding the second coding units 2332 and 2334 of the region that deviates from the boundary 2310 of the first coding unit 2320 may not be encoded. Information about the pixel value may be transformation coefficients, for example, discrete cosine coefficients, which are generated by performing transformation on pixel values included in each of the second coding units 2332 through 2338.

In Operation 2230, the encoder 930 may also encode information about an encoding mode depending on whether the second coding unit includes the region that deviates from the boundary, as described above with reference to FIGS. 18A and 18G.

Figure 24:
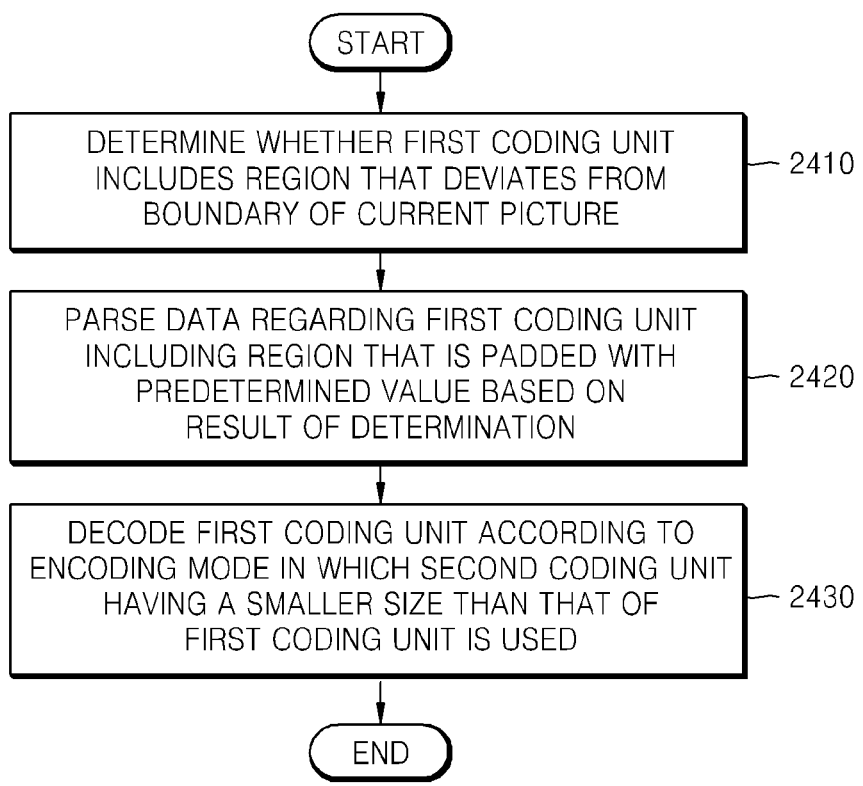
FIG. 24 is a flowchart illustrating a method of decoding an image, according to another exemplary embodiment.

FIG. 24 is a flowchart illustrating a method of decoding an image, according to another exemplary embodiment.

Referring to FIG. 24, in Operation 2410, the determiner 1610 of the apparatus 1600 for decoding an image determines whether a first coding unit includes a region that deviates from a boundary of a current picture.

In Operation 2420, the parser 1620 of the apparatus 1600 for decoding an image parses data regarding the first coding unit including a region that is padded with a predetermined value based on a result of the determination in Operation 2410.

The parsed data may include only information about the second coding units 2336 and 2338 of the region that does not deviate from the boundary 2310 of the first coding unit 2320 illustrated in FIG. 23B. The parsed data may also include only information about a motion vector and a pixel value regarding the second coding units 2336 and 2338 of the region that does not deviate from the boundary 2310 of the first coding unit 2320.

In Operation 2430, the decoder 1630 of the apparatus 1600 for decoding an image decodes the first coding unit according to an encoding mode in which second coding units having smaller sizes than that of the first coding unit are used, by using the parsed data in Operation 2420. The decoder 1630 decodes the first coding unit by performing entropy decoding, inverse-quantization, inverse transformation, and prediction on the second coding units of the first coding unit according to an encoding mode in which the second coding units are used. The decoder 1630 may decode information about an encoding mode encoded depending on whether the second coding unit includes the region that deviates from the boundary and may decode the second coding unit according to the decoded information about the encoding mode, as described above with reference to FIGS. 18A and 18G.

When the parsed data includes only information about the second coding units 2336 and 2338 of the region that does not deviate from the boundary 2310, the decoder 1630 decodes only the second coding units 2336 and 2338 of the region that does not deviate from the boundary 2310 according to an encoding mode in which the second encoding units are used.

While the exemplary embodiments have been particularly shown and described with reference to exemplary embodiments thereof, it will be understood by those of ordinary skill in the art that various changes in form and details may be made therein without departing from the spirit and scope of the exemplary embodiments as defined by the following claims. In addition, a system according to the exemplary embodiments can be implemented using a computer readable code in a computer readable recording medium.

For example, an apparatus for encoding an image and an apparatus for decoding an image, according to exemplary embodiments, may include a bus coupled to units of each of the devices shown in FIGS. 1, 2, 4, 5, 9, and 16 and at least one processor connected to the bus. In addition, a memory coupled to at least one processor for performing commands as described above can be included and connected to the bus to store the commands and received messages or generated messages.

The computer readable recording medium is any data storage device that can store data which can be thereafter read by a computer system. Examples of the computer readable recording medium include read-only memory (ROM), random-access memory (RAM), CD-ROMs, magnetic tapes, floppy disks and, optical data storage devices, etc. The computer readable recording medium can also be distributed over network coupled computer systems so that the computer readable code is stored and executed in a distributed fashion.

What is claimed is:

1. A method of decoding an image, the method comprising:
   determining coding units of a hierarchical structure, based on information about whether to divide a coding unit parsed from a received bitstream of an encoded video;
   determining whether a current coding unit among the determined coding units of the hierarchical structure comprises a region that deviates from a boundary of a current image;
   if the current coding unit is determined to not comprise the region that deviates from the boundary of the current image based on the determining whether the current coding unit comprises the region, parsing and decoding data regarding the current coding unit of the hierarchical structure; and
   if the current coding unit is determined to comprise the region that deviates from the boundary of the current image based on the determining whether the current coding unit comprises the region, determining sub coding units generated by dividing the current coding unit, that comprises the region that deviates from the boundary of the current image.

2. The method of claim 1, wherein the determining the sub coding units comprises, if the current coding unit deviates from the boundary of the current image, determining to divide the current coding unit without parsing, from the bitstream, information about whether to divide the current coding unit.

3. The method of claim 2, wherein the determining the second coding units further comprises parsing and decoding data regarding a sub coding unit that does not deviate from the boundary of the current image, from among the sub coding units.

4. The method of claim 2, wherein:
   the determining the sub coding units further comprises repeatedly dividing a sub region that deviates from the boundary of the current image, from among sub regions generated by dividing the current coding unit; and
   each of the sub coding units comprise a region generated by dividing the current coding unit at least one time.

5. The method of claim 2, wherein the determining whether the current coding unit comprises the region that deviates from the boundary of the current image comprises comparing an address of each of the current coding unit with a width or a height of the current image.

6. The method of claim 1, wherein:
   the image is hierarchically split from a plurality of maximum coding units according to information about a maximum size of a coding unit into coding units of coded depths according to depths;

a coding unit of a current depth is one of rectangular data units split from a coding unit of an upper depth;

the coding unit of the current depth is split into coding units of a lower depth, independently from neighboring coding units; and the coding units of the hierarchical structure comprise encoded coding units among coding units split from a maximum coding unit.

* * * * *